(12) United States Patent
Oyama et al.

(10) Patent No.: US 9,363,014 B2
(45) Date of Patent: Jun. 7, 2016

(54) NON-LINEAR DISTORTION COMPENSATOR, METHOD OF COMPENSATING NON-LINEAR DISTORTION, AND OPTICAL RECEIVER

(71) Applicant: FUJITSU LIMITED, Kawasaki-shi, Kanagawa (JP)

(72) Inventors: Tomofumi Oyama, Kawasaki (JP); Takahito Tanimura, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/461,167

(22) Filed: Aug. 15, 2014

(65) Prior Publication Data

US 2015/0071630 A1    Mar. 12, 2015

(30) Foreign Application Priority Data

Sep. 11, 2013  (JP) .................... 2013-188671

(51) Int. Cl.
| | |
|---|---|
| H04B 10/25 | (2013.01) |
| H04B 1/10 | (2006.01) |
| H04B 10/06 | (2006.01) |
| H03M 13/05 | (2006.01) |
| H04B 10/2543 | (2013.01) |
| H04B 10/61 | (2013.01) |

(Continued)

(52) U.S. Cl.
CPC ........ *H04B 10/2543* (2013.01); *H04B 10/0795* (2013.01); *H04B 10/6163* (2013.01); *H04B 10/6165* (2013.01); *H04L 1/0047* (2013.01)

(58) Field of Classification Search
CPC .............. H04B 10/2543; H04B 10/0795
USPC ..................................... 398/25, 9, 1
See application file for complete search history.

(56) References Cited

U.S. PATENT DOCUMENTS

| | | | | |
|---|---|---|---|---|
| 6,985,549 B1 * | 1/2006 | Biracree | ............... | H04L 7/0004 375/355 |
| 7,684,712 B1 * | 3/2010 | Roberts | ................. | H04B 10/60 375/341 |
| 8,526,828 B2 | 9/2013 | Nakashima et al. | | |

(Continued)

FOREIGN PATENT DOCUMENTS

| | | |
|---|---|---|
| EP | 2071747 A1 | 6/2009 |
| JP | 2008-211493 | 9/2008 |

(Continued)

OTHER PUBLICATIONS

Khairuzzaman et al.; "Equalization of nonlinear transmission impairments by maximum-likelihood-sequence estimation in digital coherent receivers"; Optics Express; vol. 18, No. 5; Mar. 1, 2010; pp. 4776-4782; Optical Society of America. [XP002736345].

EESR—Extended European Search Report issued for European Patent Application No. 14182091.0 dated Mar. 9, 2015.

Yan et al., "Low Complexity Digital Perturbation Back-propagation," in 37th European Conference and Exposition on Optical Communications, OSA Technical Digest (CD) (Optical Society of America, 2011), paper Tu.3.A.2. [Cited in US OA dated Oct. 28, 2015 for related U.S. Appl. No. 14/446,508].

(Continued)

*Primary Examiner* — Oommen Jacob
(74) *Attorney, Agent, or Firm* — Fujitsu Patent Center

(57) ABSTRACT

A non-linear distortion compensator includes: a non-linear distortion calculator that calculates non-linear distortion occurred in a received optical signal based on signal information after recovery of a carrier wave in a carrier wave phase recovery which recovers a phase of the carrier wave of the received optical signal; and a non-linear compensator that compensates the non-linear distortion of the received optical signal based on the non-linear distortion obtained by the non-linear distortion calculator.

6 Claims, 25 Drawing Sheets

(51) Int. Cl.
*H04L 1/00* (2006.01)
*H04B 10/079* (2013.01)

(56) References Cited

U.S. PATENT DOCUMENTS

| | | | |
|---|---|---|---|
| 8,718,180 | B2 | 5/2014 | Vetter et al. |
| 8,774,313 | B2 | 7/2014 | Dou et al. |
| 2006/0136797 | A1* | 6/2006 | Cai .................... H03M 13/3723 714/752 |
| 2009/0238304 | A1 | 9/2009 | Vetter et al. |
| 2009/0322961 | A1* | 12/2009 | Limberg ............. H03M 13/256 348/725 |
| 2009/0324224 | A1 | 12/2009 | Xie |
| 2010/0074378 | A1* | 3/2010 | Chin ................. H04L 25/03171 375/341 |
| 2010/0183104 | A1* | 7/2010 | Alexander ............ H04L 25/022 375/346 |
| 2010/0287449 | A1* | 11/2010 | Kubo .................... H04J 3/1652 714/775 |
| 2012/0014475 | A1* | 1/2012 | Wu ...................... H04B 7/0413 375/296 |
| 2012/0076235 | A1 | 3/2012 | Dou et al. |
| 2012/0128377 | A1 | 5/2012 | Hatae et al. |
| 2013/0108260 | A1 | 5/2013 | Yan et al. |
| 2013/0121163 | A1* | 5/2013 | Ehrlich .................. H04B 3/542 370/241 |
| 2015/0071630 | A1* | 3/2015 | Oyama .............. H04B 10/6163 398/25 |
| 2015/0071652 | A1 | 3/2015 | Zhuge et al. |

FOREIGN PATENT DOCUMENTS

| | | |
|---|---|---|
| JP | 2009/278613 | 11/2009 |
| JP | 2009-278613 | 11/2009 |
| JP | 2012-075097 | 4/2012 |
| JP | 2012-120010 | 6/2012 |
| WO | 2012/006575 A1 | 1/2012 |
| WO | 2013/152962 | 10/2013 |

OTHER PUBLICATIONS

Liu et al., "Phase-conjugated twin waves for communication beyond the Kerr nonlinearity limit", Nature Photonics, vol. 7, Jul. 2013, pp. 560-568. [Cited in US OA dated Oct. 28, 2015 for related U.S. Appl. No. 14/446,508].

EESR—The Extended European Search Report dated Feb. 23, 2015 for related European Patent Application No. 14180633.1, which is a counterpart of related U.S. Appl. No. 14/446,508.

Rezania M A et al: "Blind adaptive equalization algorithm based on constellation transformation for DP 16-QAM systems", Optical Fiber Communication Conference and Exposition and the National Fiber Dptic Engineers Conference (OFC/NFOEC), 2013, IEEE, Mar. 17, 2013, pp. 1-3, XP032426715. [Cited in EESR dated Feb. 23, 2015 for related European Patent Application No. 14180633.1, which is a couterpart mplication of U.S. Appl. No. 14/446,508].

Jian Hong Ke et al: "Linewidth-Tolerant and Low-Complexity Two-Stage Carrier Phase Estimation for Dual-Polarization 16-QAM Coherent Optical Fiber Communications", Journal of Lightwave Technology, IEEE Service Center, New York, NY, US, vol. 30, No. 24, Dec. 15, 2012, pp. 3987-3992, XP011474985. [Cited in US-OA dated Oct. 28, 2015 for related U.S. Appl. No. 14/446,508 and in EESR dated Feb. 23, 2015 for related European Patent Application No. 14180633.1, which is a counterpart of related U.S. Appl. No. 14/446,508.

USPTO, [Peguero] Non-Final Rejection mailed on Oct. 28, 2015 for related U.S. Appl. No. 14/446,508 (pending).

Oda et al.,"Experimental Investigation on Nonlinear Distortions with Perturbation Back-propagation Algorithm in 224 Gb/s DP-16QAM Transmission", OFC/NFOEC Technical Digest, 2012, Optical Fiber Communication Conference, OSA Technical Digest. [Cited in US OA dated Oct. 28, 2015 for related U.S. Appl. No. 14/446,508].

USPTO, [Peguero] Final Rejection mailed on Mar. 16, 2016 for related U.S. Appl. No. 14/446,508 (pending).

* cited by examiner

NON-LINEAR DISTORTION COMPENSATOR, METHOD OF COMPENSATING NON-LINEAR DISTORTION, AND OPTICAL RECEIVER

CROSS-REFERENCE TO RELATED APPLICATION

This application is based upon and claims the benefit of priority of the prior Japanese Patent Application No. 2013-188671, filed on Sep. 11, 2013, the entire contents of which are incorporated herein by reference.

FIELD

The embodiments discussed herein are related to a non-linear distortion compensation apparatus and method, and an optical receiver.

BACKGROUND

In a communication system, a technology to improve signal quality by performing digital signal processing on signals in a transceiver have been generally used. The technology to improve signal quality using the digital signal processing have already been put to practical use from the past in radio communication. Recently, in an optical communication field, a digital coherent communication system in which a digital signal processing circuit is installed in a transceiver has been studied.

The digital signal processing may compensates, for example, incompleteness of a device used for a communication apparatus or deterioration of a signal on a transmission line. For example, Japanese Laid-open Patent Publication No. 2012-120010 or Japanese Laid-open Patent Publication No. 2009-278613 discloses that an amplitude, a frequency, a polarization, or the like of signal is controlled by digital signal processing on a transmission side.

Here, one of compensation targets of the digital signal processing is non-linearity of characteristics of a transceiving device such as an amplifier (AMP), non-linear characteristics of a transmission line, or the like. The non-linearity of characteristics of the transceiving device is a compensation target common to the radio communication field and the optical communication field. In contrast, non-linear characteristics or wavelength dispersion characteristics of optical fibers used for an optical transmission line is a compensation target unique to the optical communication field.

One of technologies for pre-equalizing wavelength dispersion characteristics of optical fibers on a transmission side is disclosed in Japanese Laid-open Patent Publication No. 2008-211493. Meanwhile, one of technologies for compensating deterioration of signals caused by non-linear characteristics of an optical fiber is disclosed in Japanese Laid-open Patent Publication No. 2012-075097.

As one of methods for increasing communication capability, a technology for increasing a multivalued level in a modulation scheme is considered. However, as the multivalued level is increased, a higher signal-to-noise ratio (SNR) would be required. The SNR is improved by increasing power of a signal input to an optical fiber used for a transmission line. However, due to the non-linear characteristics of the optical fiber, as the power of an input signal increases, a signal would remarkably deteriorate due to non-linear distortion.

With respect to the above-described problem, Japanese Laid-open Patent Publication No. 2012-075097 discloses a technology for compensating non-linear distortion by using digital signal processing on a transmission side. According to Japanese Laid-open Patent Publication No. 2012-075097, propagation of a polarization multiplexed optical signal in an optical fiber is modeled by the Manakov equation as in Equation (A) below.

$$\frac{\partial}{\partial z}u_H(t,z) + \frac{\alpha(z)}{2}u_H(t,z) + j\frac{\beta_2(z)}{2}\frac{\partial}{\partial t^2}u_H(t,z) = \qquad (A)$$
$$j\gamma(z)[|u_H(t,z)|^2 + |u_V(t,z)|^2]u_H(t,z)$$
$$\frac{\partial}{\partial z}u_V(t,z) + \frac{\alpha(z)}{2}u_V(t,z) + j\frac{\beta_2(z)}{2}\frac{\partial}{\partial t^2}u_V(t,z) =$$
$$j\gamma(z)[|u_V(t,z)|^2 + |u_H(t,z)|^2]u_V(t,z)$$

In Equation (A), $u_H(t, z)$ and $u_V(t, z)$ indicate electric field components of horizontal polarized and vertical polarized signals at a time t and a position z, respectively. Further, $\alpha(z)$, $\beta_2(z)$, and $\gamma(z)$ indicate a damping coefficient, a dispersion coefficient, and a nonlinear coefficient of a fiber at the position z, respectively.

The non-linear distortion is obtained by solving a differential equation expressed in Equation (A) above. However, since it is complex to obtain a solution analytically, non-linear distortion obtained by using approximation is used for non-linear compensation.

In the technology disclosed in Japanese Laid-open Patent Publication No. 2012-075097, the Manakov equation expressed in Equation (A) is analyzed using the perturbation theory and the nonlinear distortion is compensated on the transmission side. That is, solutions $u_H(t=kT, z=L)$ and $u_V(t=kT, z=L)$ of nonlinear propagation of a horizontal polarized (H polarized) component and a vertical polarized (V polarized) component at a position L of a k-th symbol are expressed as in Equation (B) below and analyzed.

$$u_H(kT,L)=u_H(kT,0)+\Delta U_H(k)$$
$$u_V(kT,L)=u_V(kT,0)+\Delta u_V(k) \qquad (B)$$

Here, $u_H(kT, 0)/u_V(kT, 0)$ indicates an electric field at a position z=0 of the H/V polarized component and $\Delta u_H(k)/\Delta u_V(k)$ indicates a perturbation term by a non-linear effect of the H/V polarized component.

When a signal of a k-th symbol of the H/V polarized component is considered to be a pulse with an amplitude $A_k^{H/V}$, Equation (C) below can be obtained.

$$u_H(t=kT, z=L) = \qquad (C)$$
$$u_H(t=kT, 0) + \sum_{m,n}\{[A_{m+k}^H A_{n+k}^H(A_{m+n+k}^H)^* + A_{m+k}^H A_{n+k}^V(A_{m+n+k}^V)^*] \times$$
$$C(m,n,z=L)\}$$
$$u_V(t=kT, z=L) = u_V(t=kT, 0) + \sum_{m,n}\{[A_{m+k}^V A_{n+k}^V(A_{m+n+k}^V)^* +$$
$$A_{m+k}^V A_{n+k}^H(A_{m+n+k}^H)^*] \times C(m,n,z=L)\}$$
$$C(m,n,z=L) = j\int_0^L \frac{\gamma(z)p(z)}{\sqrt{1+2js(z)/\tau^2 + 3(s(z)/\tau^2)^2}}\exp$$
$$\left\{-\frac{3mnT^2}{\tau^2(1+3)js(z)/\tau^2)} - \frac{(m-n)^2T^2}{\tau^2[1+2js(z)/\tau^2+3(s(z)/\tau^2)^2]}\right\}dz$$

Here, m and n are integers. Further, p(z) indicates a signal power at the position z, s(z) indicates a total accumulated dispersion value in a transmission line for the purpose of propagation at the position z, τ indicates a half width of a pulse, and T indicates a pulse period. As understood from Equation (C) above, the perturbation term by the non-linear effect of the H/V polarized component indicates a sum of products of three amplitudes $A_k^{H/V}$. Further, C(m, n, z=L) is coefficient indicating the degree that a product of amplitudes in a combination of given n and m becomes non-linear distortion and is obtained by perturbation analysis.

In a signal processing circuit, as a to-be-processed signal becomes complex, bit accuracy is required to be higher, so that the size of the signal processing circuit becomes very large. Since a signal processed by the signal processing circuit of a reception side contains noise or distortion occurred in a transmission line or a transceiving device, the signal is processed as a multi-bit digital signal. Therefore, calculation of non-linear distortion becomes complex.

SUMMARY

According to an aspect of the embodiments, a non-linear distortion compensation apparatus includes: a non-linear distortion calculator that calculates non-linear distortion occurred in a received optical signal based on signal information after recovery of a carrier wave in a carrier wave phase recovery that recovers a phase of the carrier wave of the received optical signal;

and a non-linear compensator that compensates the non-linear distortion of the received optical signal based on the non-linear distortion obtained by the non-linear distortion calculator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
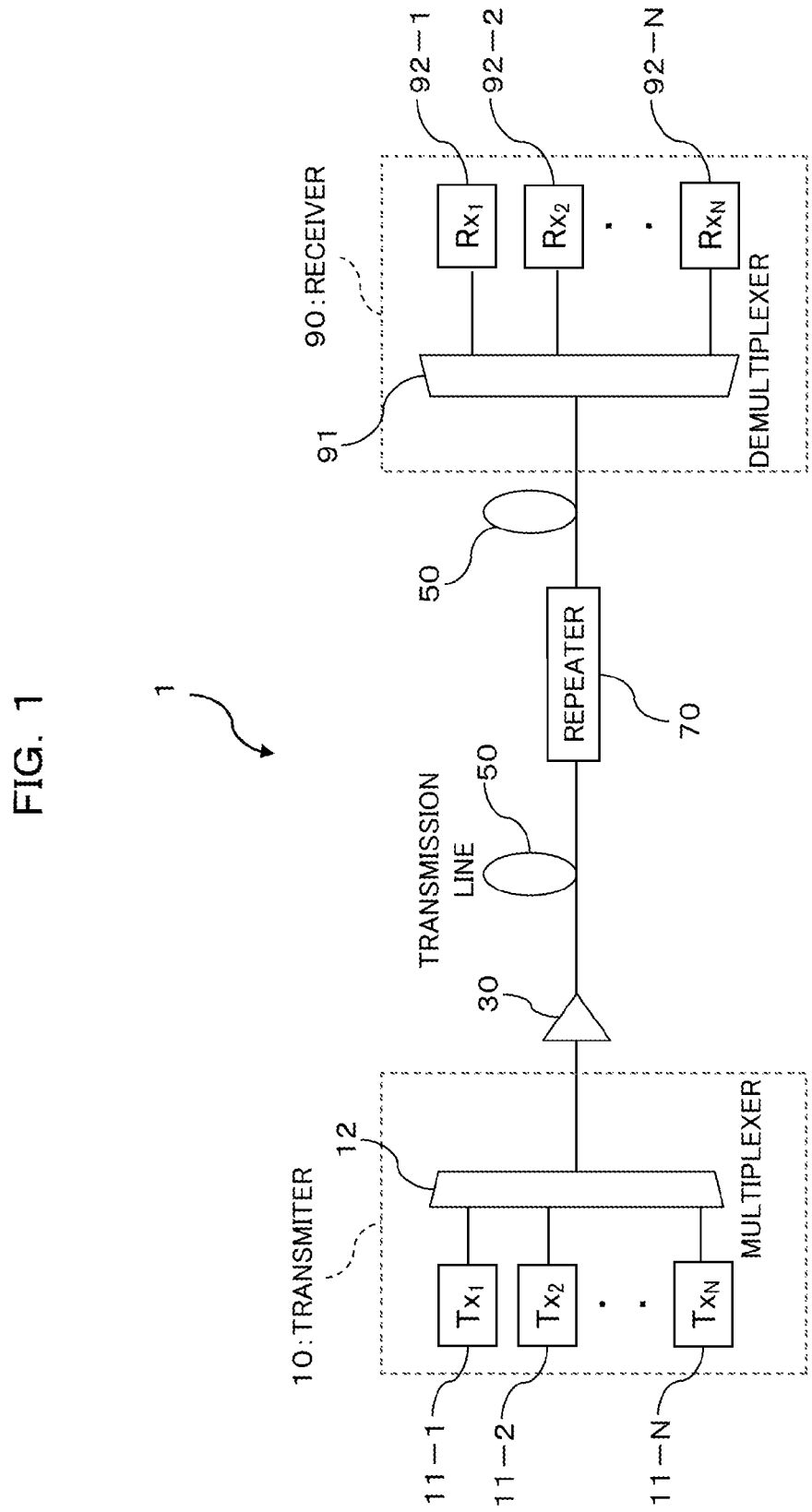
FIG. 1 is a block diagram illustrating an example of an optical communication system according to an embodiment.

Hereinafter, embodiments will be described with reference to the drawings. However, the embodiments described below are merely examples and various modifications or applications of the technology not specified below are not intended to be excluded. Further, throughout the drawings used in the following embodiments, portions to which the same reference numerals are given indicate the same or equivalent portions unless otherwise stated.

FIG. 1 is a block diagram illustrating an example of an optical communication system according to an embodiment. The optical communication system 1 illustrated in FIG. 1 is, for example, a wavelength division multiplexing (WDM) optical transmission system which transmits WDM light. The WDM optical transmission system 1 is configured to include, for example, a WDM optical transmitter 10, an optical transmission line 50 using an optical fiber, and a WDM optical receiver 90.

The WDM optical transmitter 10 transmits a WDM optical signal obtained by wavelength-multiplexing optical signals of multiple wavelengths (channels) to the optical transmission line 50, and the WDM optical receiver 90 demultiplexes the WDM optical signal transmitted through the optical transmission line 50 into optical signals for each wavelength and receives the wavelength signals. The WDM optical transmitter 10 and the WDM optical receiver 90 are examples of communication apparatuses.

One or more of optical amplifiers 30 or one or more of repeaters 70 may be provided for the optical transmission line 50 according to a transmission distance of the WDM optical signal from the WDM optical transmitter 10 to the WDM optical receiver 90.

The WDM optical transmitter 10 includes, for example, optical transmitters 11-1 to 11-N (where N is an integer equal to or greater than 2) provided for respective wavelengths and a multiplexer 12 that performs wavelength multiplexing (combining) on optical signals transmitted by the optical transmitters 11-1 to 11-N to generate a WDM optical signal and outputs the generated WDM optical signal.

Meanwhile, the WDM optical receiver 90 includes, for example, a demultiplexer 91 that demultiplexes the WDM optical signal received from the optical transmission line 50 into optical signals with the wavelengths and optical receivers 92-1 to 92-N that receives the optical signals with the respective wavelengths demultiplexed by the demultiplexer 91.

Figure 2:
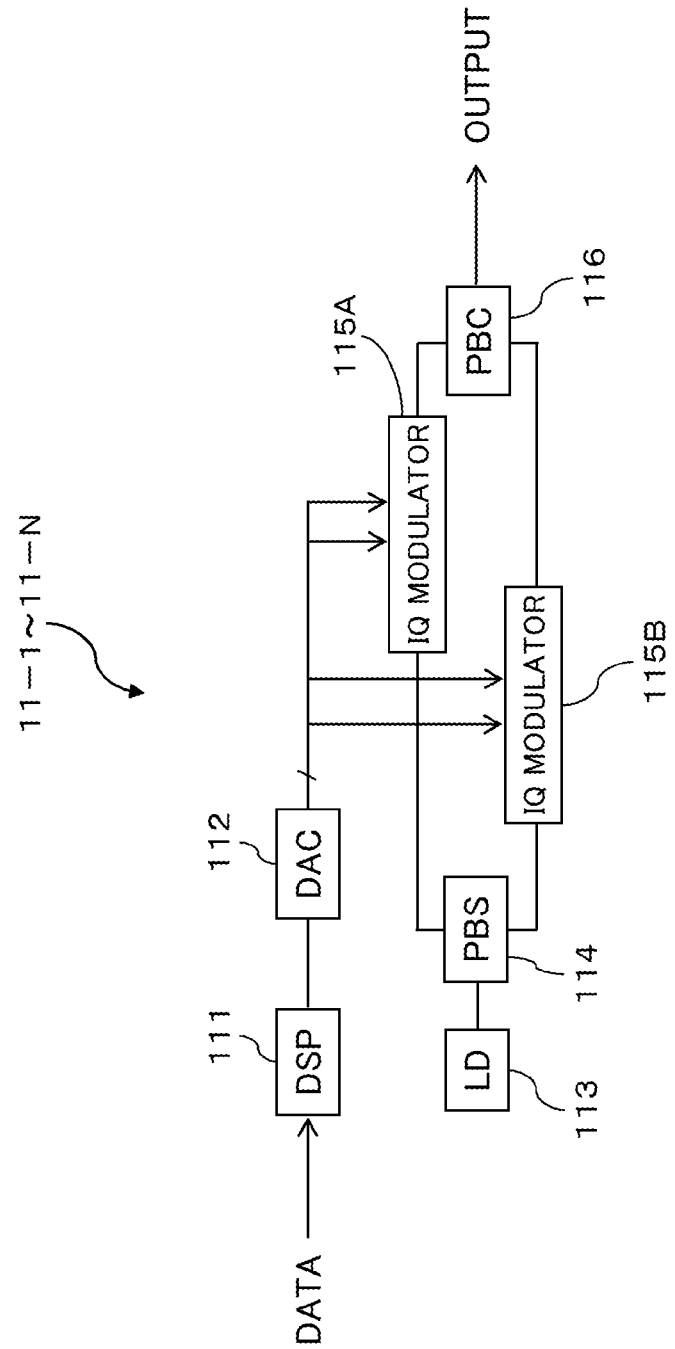
FIG. 2 is a block diagram illustrating an example of a configuration of an optical transmitter illustrated in FIG. 1.

Each of the optical transmitters 11-1 to 11-N may be an optical transmitter which transmits a single-polarized signal or may be an optical transmitter which transmits polarization multiplexed signals. An example of the configuration of the latter polarization multiplexed signal transmitter is illustrated in FIG. 2. The polarization multiplexed signal transmitter illustrated in FIG. 2 includes a digital signal processor (DSP) 111, a digital-analog converter (DAC) 112, a light source (laser diode, LD) 113, a beam splitter (BS) 114, IQ modulators 115A and 115B for an H-polarized wave and a V-polarized wave, and a polarized beam combiner (PBC) 116.

The DSP 111 performs digital signal processing such as a non-linear pre-equalization described later on the transmission data signal. The DSP 111 is an example of an arithmetic processing circuit, and the arithmetic processing circuit may be implemented by using a field programmable gate array (FPGA) or a large-scale integrated (LSI) circuit.

The DAC 112 converts the transmission data signal processed as a digital signal by the DSP 111 into an analog signal and inputs the analog signal to the IQ modulators 115A and 115B.

The light source 113 outputs transmission light, and the BS 114 splits the transmission light of the light source 113 into two transmission lights to input the split lights to the IQ modulators 115A and 115B.

The IQ modulators 115A and 115B each perform multi-valued level modulation (IQ-modulation) on the split transmission light input from the BS 114 according to the analog transmission data signal input from the DAC 112. One of the IQ modulators 115A and 115B outputs an optical modulated signal corresponding to the H-polarized component and the other thereof outputs an optical modulated signal corresponding to the V-polarized component.

The PBC 116 performs polarization combination on the optical modulated signals of the polarized components from the IQ modulators 115A and 115B and outputs the combined signal.

Figure 3:
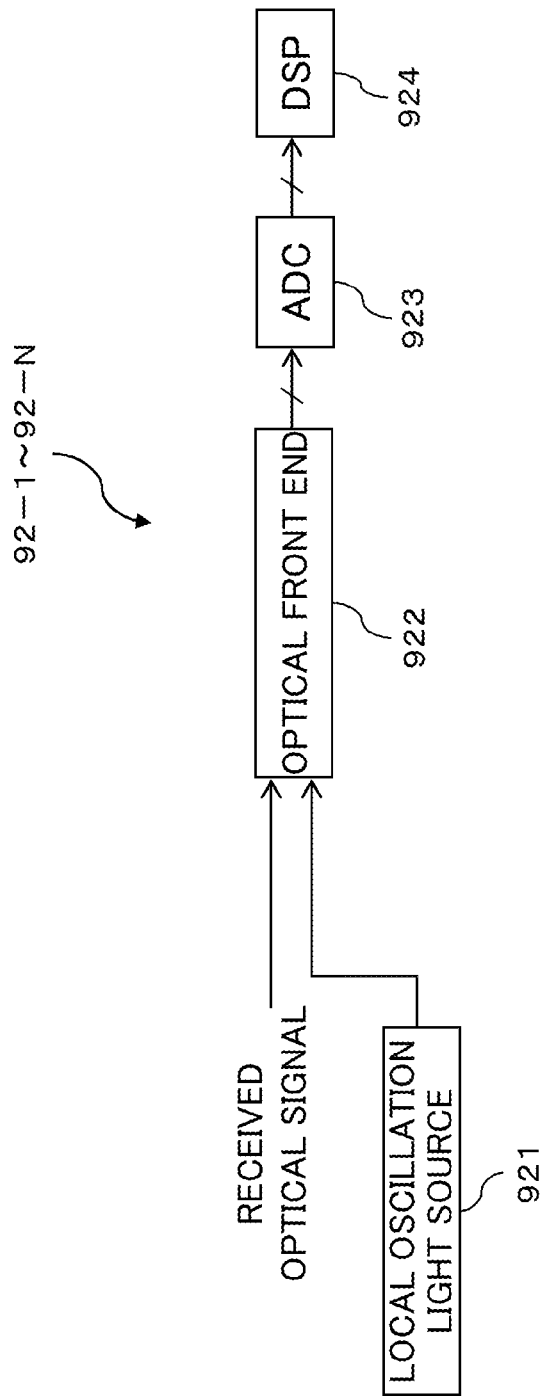
FIG. 3 is a block diagram illustrating an example of a configuration of an optical receiver illustrated in FIG. 1.

Meanwhile, as illustrated in FIG. 3, each of the optical receivers 92-1 to 92-N illustrated in FIG. 1 is configured to include, for example, a local oscillation light source 921, an optical front end 922, an analog-digital converter (ADC) 923, and a DSP 924. The DSP 924 performs non-linear distortion compensation using virtual symbols. The optical front end 922 has a function of demodulating and photoelectrically-converting a received optical signal using local light of the local oscillation light source 921. The ADC 923 converts the reception analog electric signal photoelectrically-converted by the optical front end 922 into a digital signal and inputs the digital signal to the DSP 924.

The DSP 924 performs signal processing including the non-linear distortion compensation using the above-mentioned virtual symbol on the reception digital electric signal input from the ADC 923. The DSP 924 is an example of an arithmetic processing circuit. Similarly to the DSP 111 of the transmission side, the DSP 924 may also be implemented by using an FPGA or an LSI circuit.

Figure 4:
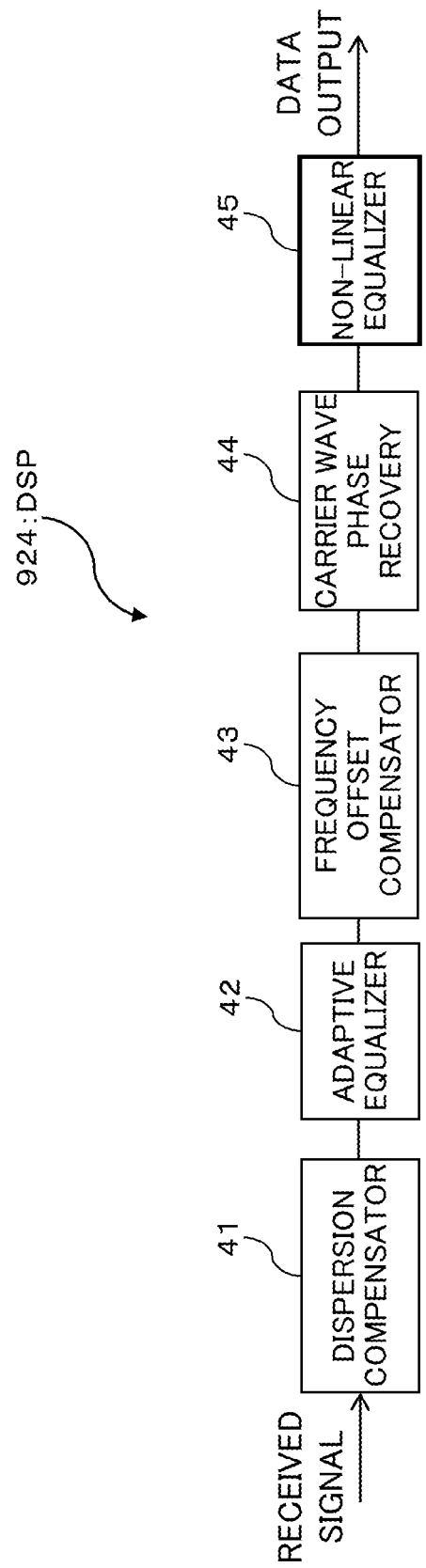
FIG. 4 is a block diagram illustrating an example of a functional configuration implemented by a DSP illustrated in FIG. 3.
Figure 5:
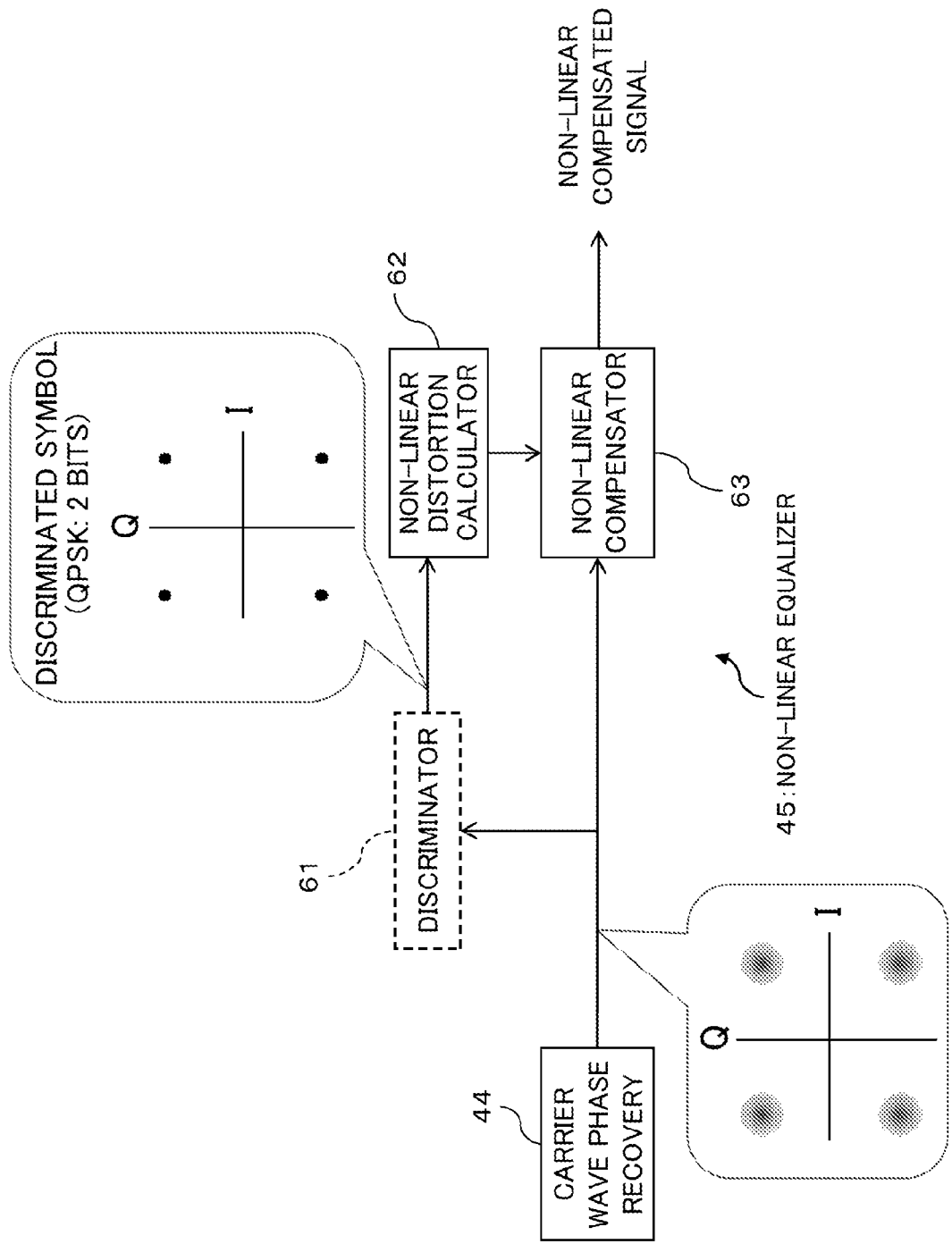
FIG. 5 is a block diagram illustrating an example of a configuration of a non-linear equalizer illustrated in FIG. 4.

For example, as illustrated in FIG. 4, the DSP 924 may include, upon focusing on a functional configuration thereof, a dispersion compensator 41, an adaptive equalizer 42, a frequency offset compensator 43, a carrier wave phase recovery 44, and a non-linear equalizer 45. As illustrated in FIG. 5, the non-linear equalizer 45 may include a discriminator 61, a non-linear distortion calculator 62, and a non-linear compensator 63. The non-linear equalizer 45 may be disposed to the post stage of the carrier wave phase recovery 44, and one or more of other signal processors may be inserted before and after the non-linear equalizer 45. Further, one or more of other signal processors may be interposed at any stages between the units 41 to 44. Furthermore, one of the units 41 to 43 may be unnecessary.

The dispersion compensator 41 compensates, for example, wavelength dispersion occurred in the received signal (digital signal) by the digital signal processing. By performing compensation of the wavelength dispersion using the digital signal processing, an optical device such as a wavelength dispersion compensation fiber (DCF) may be unnecessary for the optical transmission line. Therefore, it is possible to obtain the advantages of suppressing an increase in optical noise occurred in compensation of DCF loss and suppressing wavelength distortion due to a non-linear optical effect in the DCF. Further, it is also possible to obtain the advantage of flexibly changing a dispersion compensation amount. When wavelength dispersion compensation is performed optically using the DCF or the like, the dispersion compensator 41 may be unnecessary.

The adaptive equalizer 42 performs, for example, a polarization process including a separation of polarized components or a polarization mode dispersion (PMD) compensation (adaptive equalization) on the received signal (digital signal). The adaptive equalization is possible to compensate, by using a plurality of linear filters, polarization change and PMD waveform distortion according to time varying at a high speed by adaptively updating parameters of the linear filters at a sufficiently higher speed than that of the polarization change of the signal light in the optical fiber.

The frequency offset compensator 43 compensates (or correct) a frequency offset between the received signal and the local oscillation light. For example, the frequency offset compensator 43 compensates a frequency offset by estimating a frequency offset from the received signal and applying reverse phase rotation corresponding to the estimated frequency offset to the received signal. The frequency offset estimation may be performed by using, for example, an estimation method called an exponentiation method or an estimation method called a pre-decision based angle differential frequency offset Estimator (PADE) method which is possible to extend an estimation range in comparison with the exponentiation method.

The carrier wave phase recovery (carrier phase estimator) 44 estimates and recovers a correct phase of the carrier by removing an amplified spontaneous emission (ASE) noise occurred in the optical amplifier 30 or a laser phase noise from the received signal. The carrier phase estimation may be performed by using, for example, a feedback method which is possible to remove an effect of noise using a digital loop filter or a feed forward method which is possible to remove an effect of noise by averaging estimated phase differences detected by a phase detector.

The non-linear equalizer 45 compensates (or equalizes) the non-linear distortion occurred in the received signal. For example, as illustrated in FIG. 5, the non-linear equalizer 45 is available to identify (or preliminarily discriminate) a symbol (QPSK symbol as a non-restrictive example) of the received signal, to calculate the non-linear distortion based on the preliminarily-discriminated symbol, and to compensate the non-linear distortion based on the result of the calculation.

For example, the discriminator 61 discriminates the received signal with a specific symbol and outputs the discriminated symbol. Noise or the like in the optical transmission line 50 is added to the received signal. As an example of a discrimination scheme of the discriminator 61, there are schemes 1-1, 1-2, and 2 to 5 described later.

The non-linear distortion calculator 62 calculates the non-linear distortion based on the symbol discriminated by the discriminator 61. For example, the non-linear distortion calculator 62 calculates the non-linear distortion occurred in every symbol due to the non-linear optical effect based on transmission line information, channel information, and the discriminated symbol.

As an example of the transmission line information, a transmission line length or a kind of optical fiber (a dispersion coefficient, an attenuation coefficient, a non-linear coefficient, or the like) can be exemplified. As an example of the channel information, a symbol rate, optical power input to an optical fiber, a central wavelength, or the like can be exemplified. For example, the transmission line information and the channel information can be stored in a memory (not illustrated) of the DSP 924, and the non-linear distortion calculator 62 appropriately reads information (parameters) used to calculate the non-linear distortion from the memory and calculates the non-linear distortion. The above-described perturbation analysis can be applied to the calculation.

The non-linear compensator 63 performs the non-linear distortion compensation on the received signal based on the non-linear distortion calculated by the non-linear distortion calculator 62. For example, the non-linear compensator 63 subtracts the non-linear distortion calculated by the non-linear distortion calculator 62 from the corresponding symbol of the received signal.

Figure 6:
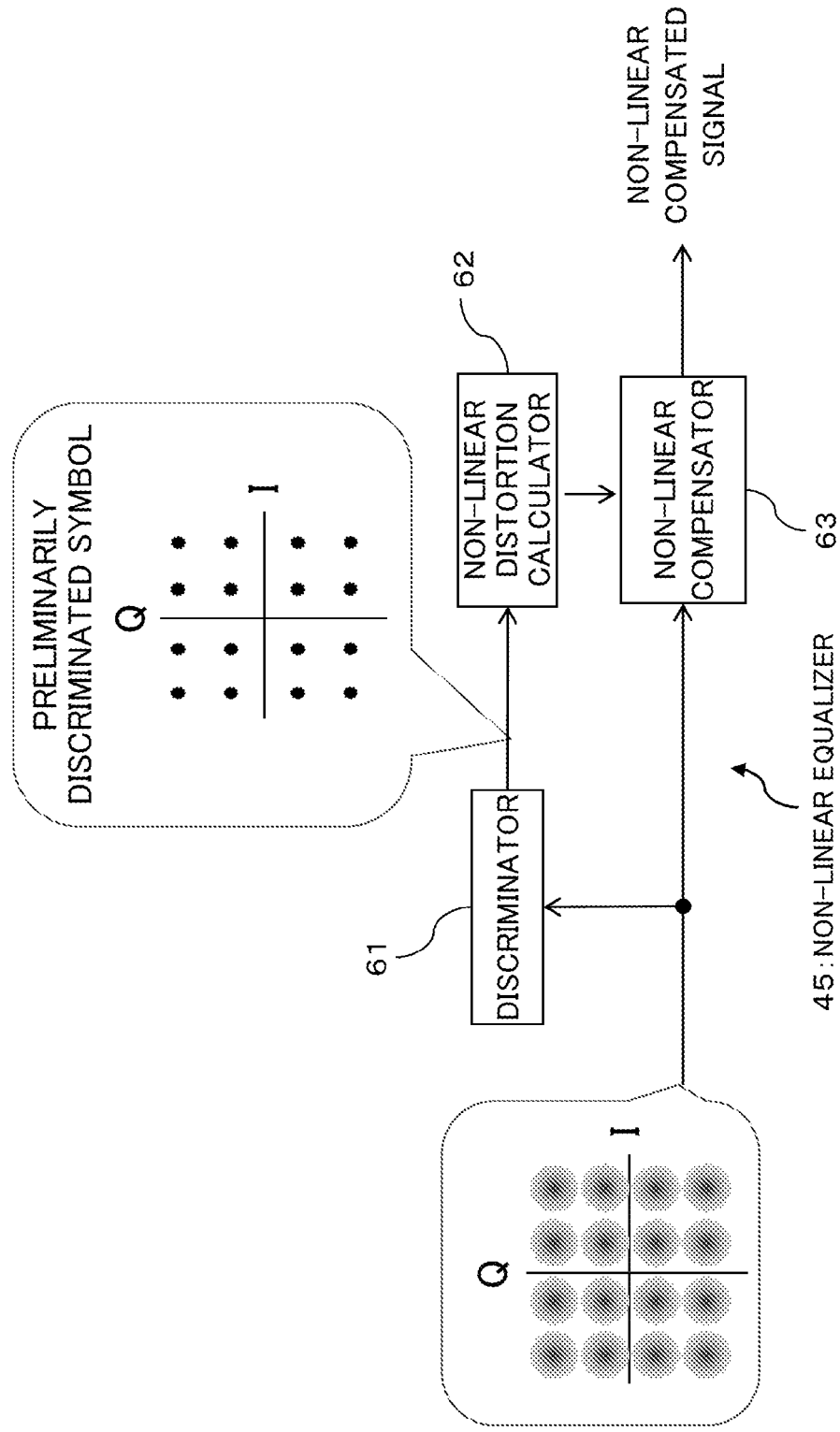
FIG. 6 is a block diagram illustrating an example of a configuration of the non-linear equalizer illustrated in FIG. 4.

Although the QPSK signal is exemplified as a received signal in FIG. 5, the modulation scheme of the signal which can be compensated by the non-linear equalizer 45 according to the embodiment is not limited to the QPSK signal. For example, the non-linear equalizer 45 may compensate the non-linear distortion of the signal such as an amplitude-shift keying (ASK) signal, a phase-shift keying (PSK) signal, and a quadrature amplitude modulation (QAM) signal. As a non-restrictive example, FIG. 6 illustrates a state where a 16-QAM signal as a received signal is input to the non-linear equalizer 45 and symbol identification (preliminary discrimination) is performed by the discriminator 61.

(Example of Operations of Non-Linear Equalizer 45)

Figure 7:
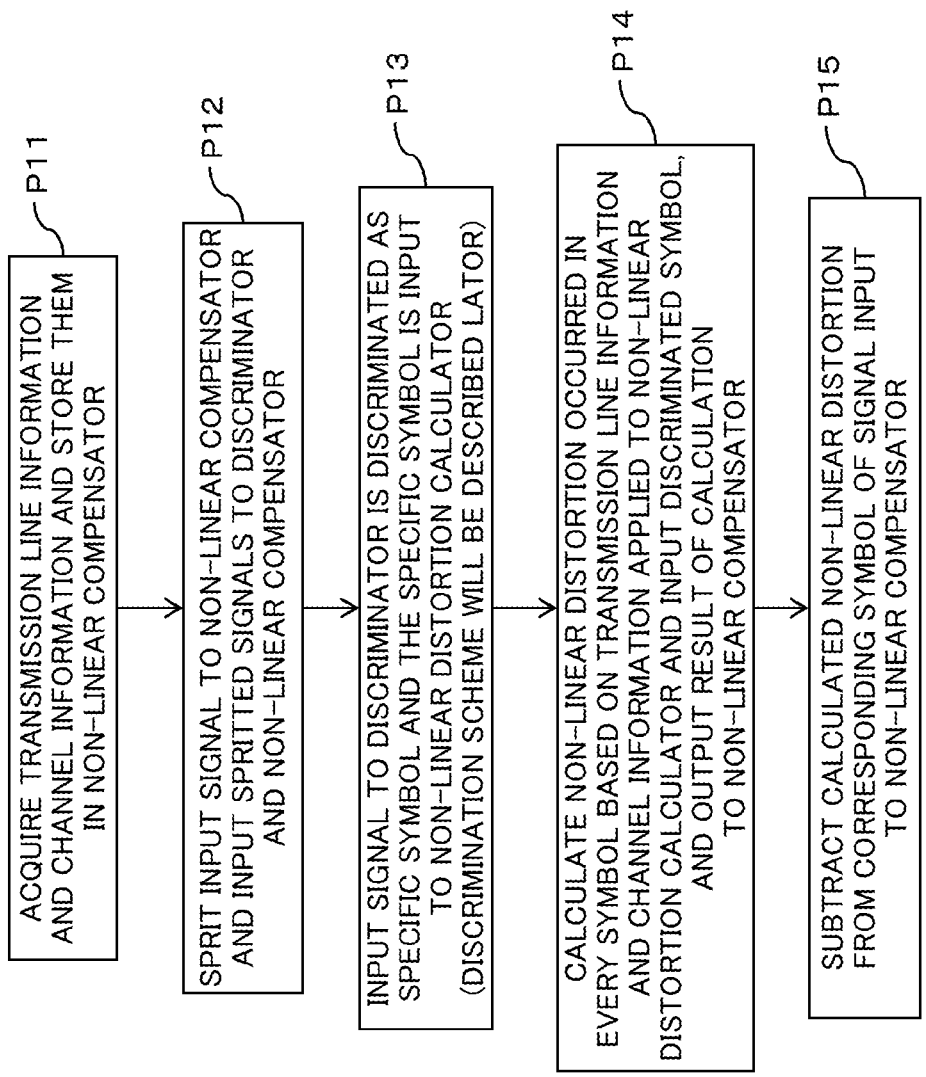
FIG. 7 is a flowchart for describing an example of operations of the non-linear equalizer illustrated in FIG. 4.

Next, FIG. 7 illustrates a flowchart for describing an example of operations of the non-linear equalizer 45. As illustrated in FIG. 7, first, the transmission line information and the channel information are stored in the memory of the DSP 924 (Process P11).

The input signal for the non-linear equalizer 45 is split into two signals. One signal is input to the discriminator 61, and the other signal is input to the non-linear compensator 63 (Process P12).

The input signal input to the discriminator 61 is discriminated as a specific symbol by the discriminator 61, and the discriminated symbol is input to the non-linear distortion calculator 62 (Process P13).

The non-linear distortion calculator 62 appropriately reads out the aforementioned transmission line information and channel information from the memory, calculates the non-linear distortion occurred in every symbol based on the information and the symbol input from the discriminator 61, and outputs a result of the calculation to the non-linear compensator 63 (Process P14).

The non-linear compensator 63 compensates the non-linear distortion of every symbol by subtracting the non-linear distortion calculated by the non-linear distortion calculator 62 from the corresponding symbol of the other split signal of the received signal (Process P15).

Next, the discrimination schemes 1-1, 1-2, and 2 to 5 performed by the discriminator 61 will be described with reference to FIGS. 8 to 21.

Figure 8:
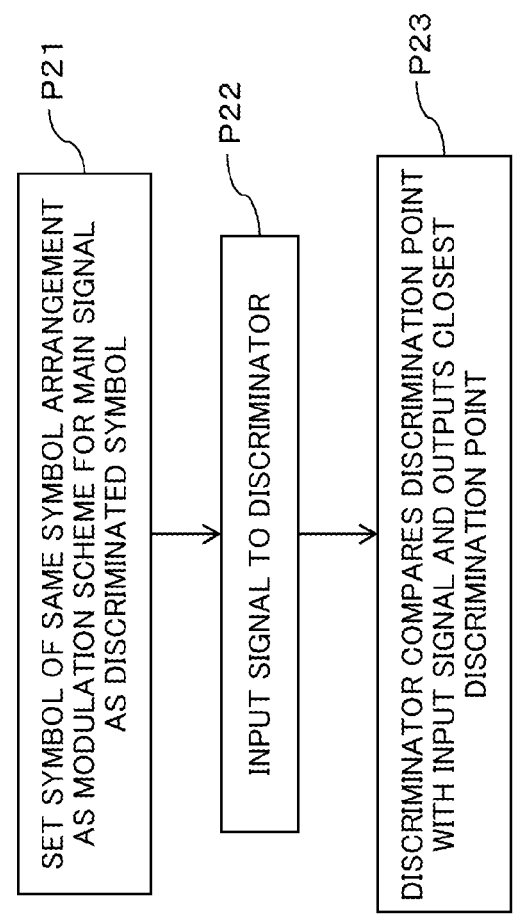
FIG. 8 is a flowchart for describing an example of operations (discrimination scheme 1-1) of a discriminator illustrated In FIGS. 5 to 7.
Figure 9:
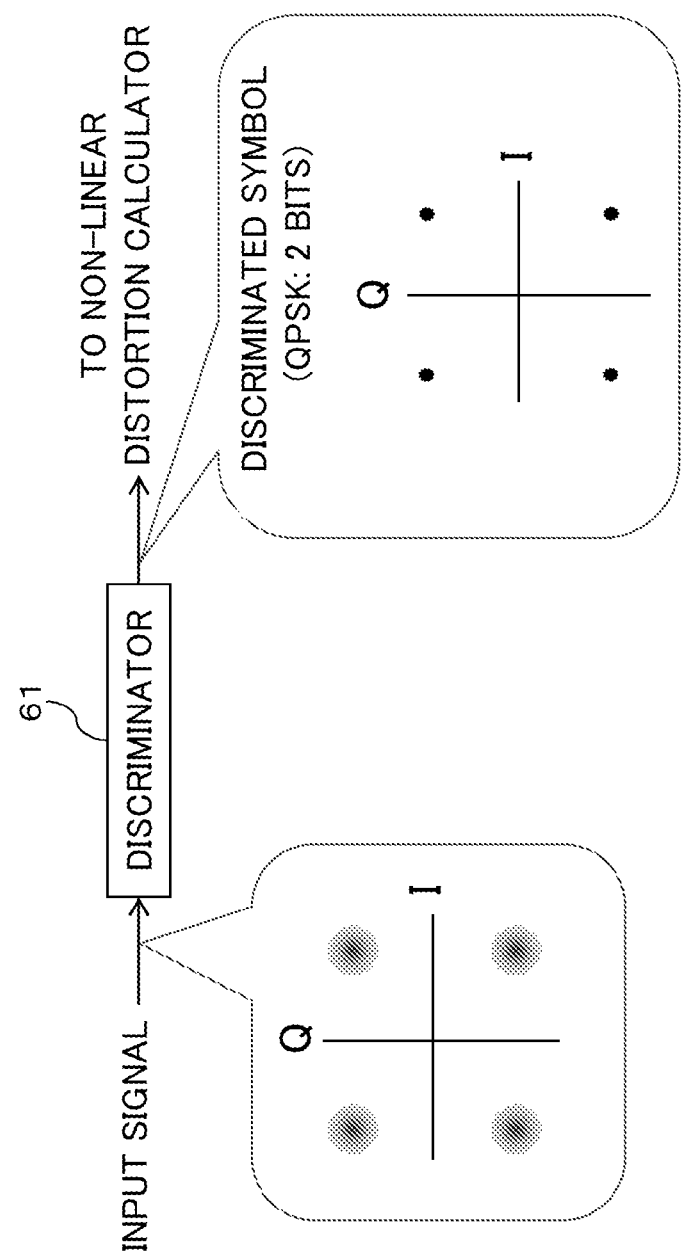
FIG. 9 is a diagram illustrating a signal input to the discriminator and a signal output from the discriminator on a complex plane (IQ plane) in the discrimination scheme 1-1.
Figure 10:
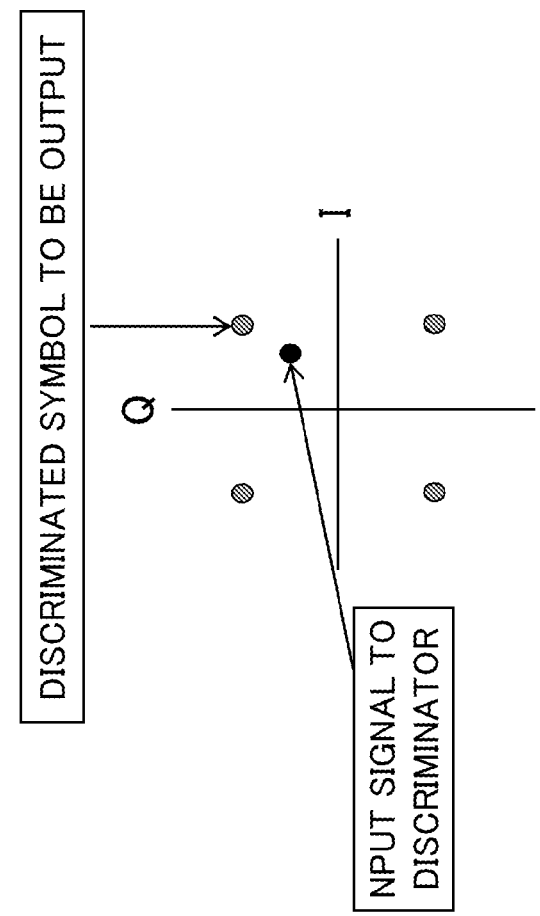
FIG. 10 is a diagram illustrating a relation between the signal input to the discriminator and the signal output from the discriminator on the IQ plane in the discrimination scheme 1-1.

(Discrimination Scheme 1-1: FIGS. 8 to 10)

In the discrimination scheme 1, as illustrated in FIG. 8, first, a discriminated symbol (or arrangement) according to a modulation scheme for a main signal of a received signal is set in the discriminator 61 (Process P21). Next, the discriminator 61 compares the set symbol (discrimination point) with the input main signal and outputs the symbol closest to the discrimination point on the IQ plane as a result of the discrimination (Processes P22 and P23).

As a non-restrictive example, FIGS. 9 and 10 illustrate a state where the received signal is a QPSK signal and the input signal is discriminated as any one of four discrimination points represented by 2 bits on the IQ plane in the discriminator 61. FIG. 10 illustrates a state where an input symbol positioned on the first quadrant of the IQ plane is discriminated (or converted) and output as the discrimination point (QPSK symbol) set on the same first quadrant.

Figure 11:
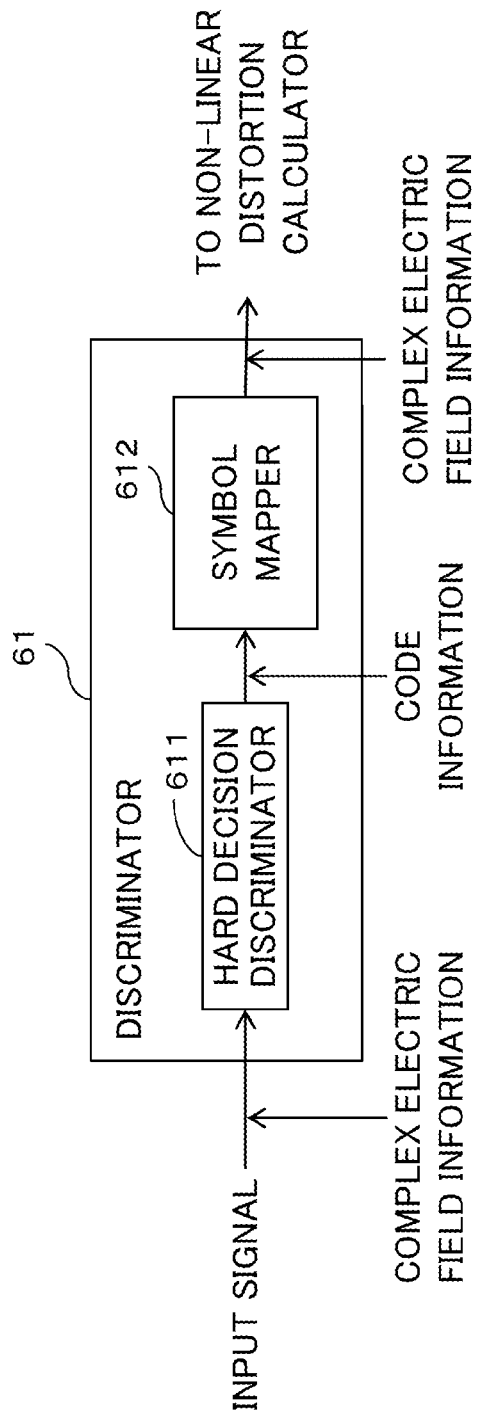
FIG. 11 is a block diagram illustrating an example of a configuration (discrimination scheme 1-2) of the discriminator illustrated in FIGS. 5 to 7.
Figure 12:
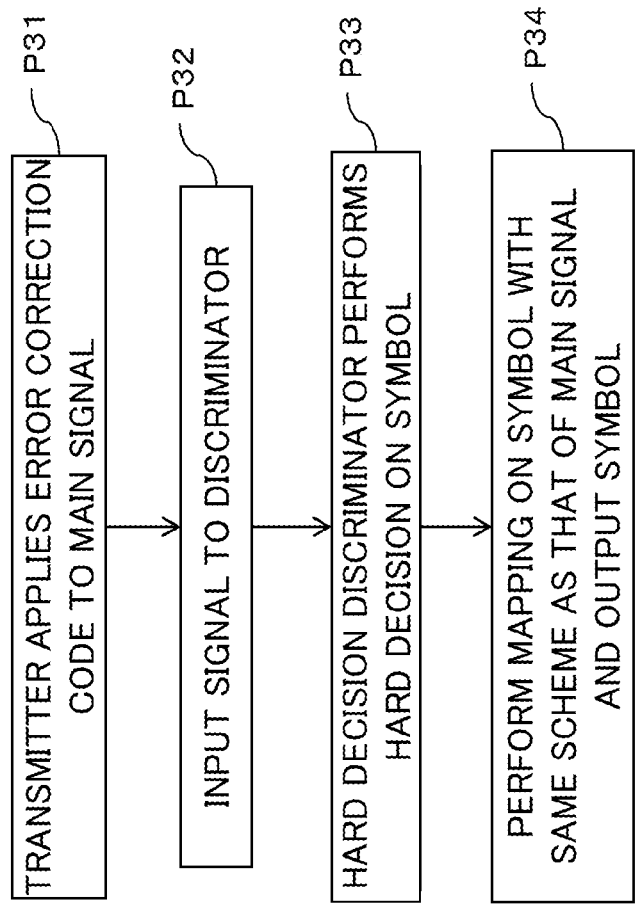
FIG. 12 is a flowchart for describing an example of operations of the discriminator illustrated in FIG. 11.

(Discrimination Scheme 1-2: FIGS. 11 and 12)

In the discrimination scheme 1-2, as illustrated in FIG. 11, the discriminator 61 is configured to include a hard decision discriminator 611 and a symbol mapper 612.

The hard decision discriminator 611 performs hard decision on a symbol (or complex electric field information) of the input main signal based on an error correction code given to the main signal on the transmission side (Processes P31 to P33 of FIG. 12). For example, the hard decision discriminator 611 discriminates and converts the complex electric field information into code information (or binary data) in comparison with a threshold value. The complex electric field information is an example of signal information of the received optical signal.

The obtained code information is input to the symbol mapper 612. The symbol mapper 612 performs re-mapping on the code information to a symbol (or complex electric field information) with the same scheme as that of the input main signal and outputs the symbol (Process P34 of FIG. 12). For example, in the case where the input main signal is a QPSK signal, similarly to the cases of FIGS. 9 and 10, the input main signal is re-mapped to any one of the four QPSK symbols represented by 2 bits on the IQ plane.

Figure 13:
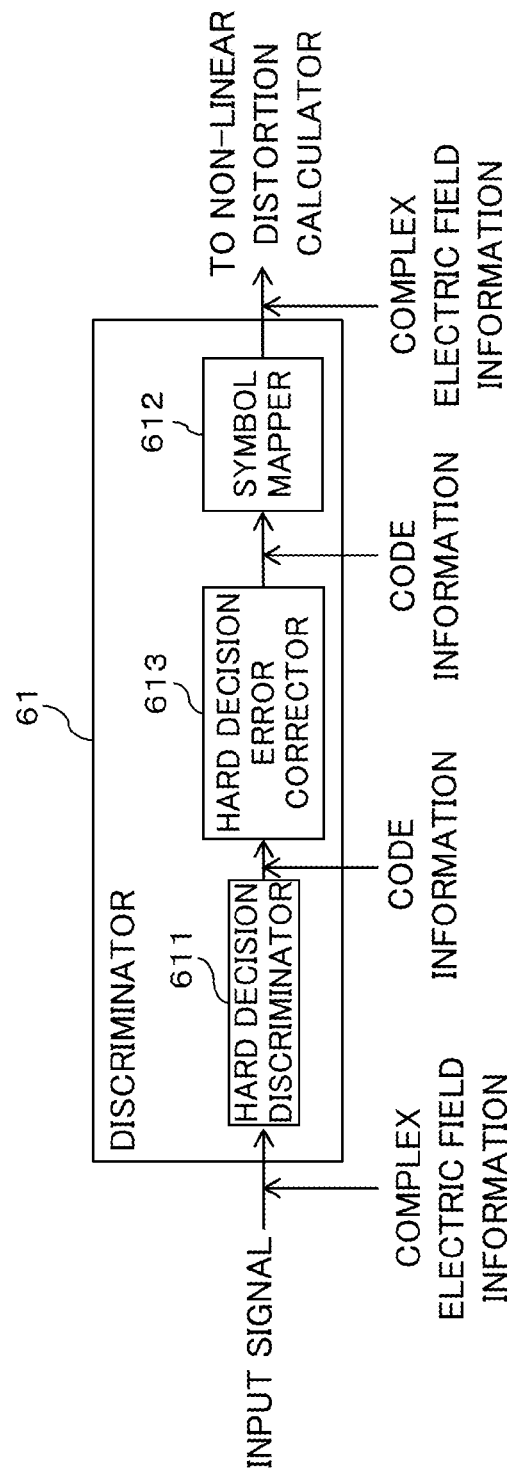
FIG. 13 is a block diagram illustrating an example of a configuration (discrimination scheme 2) of the discriminator illustrated in FIGS. 5 to 7.
Figure 14:
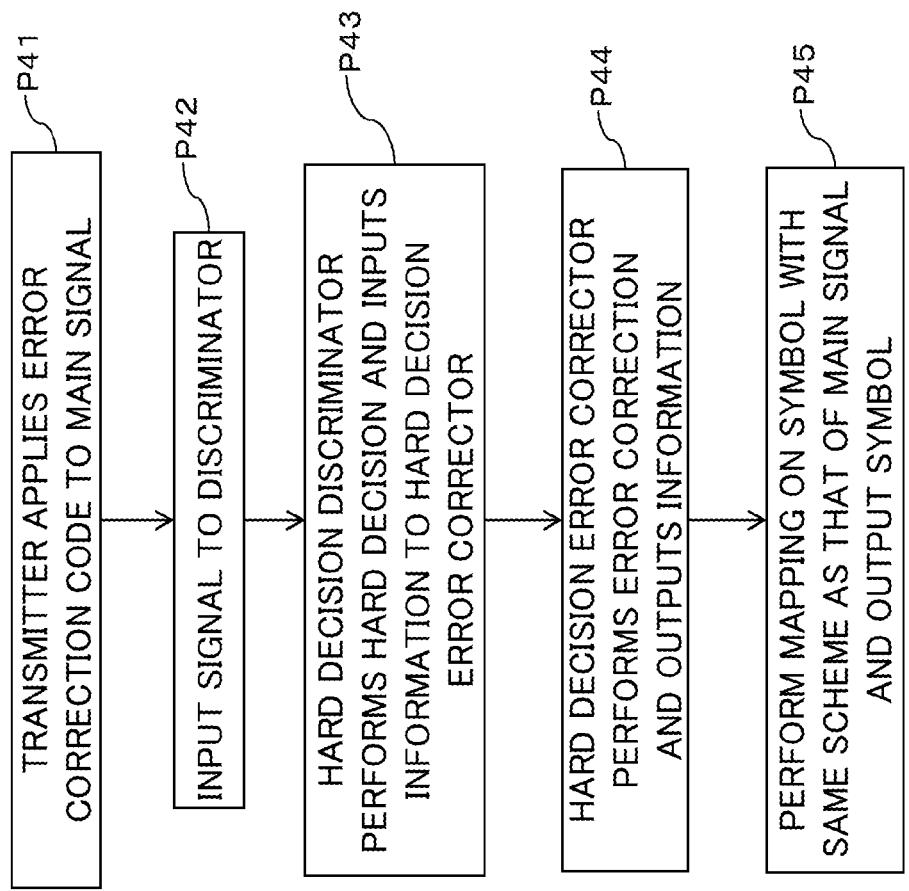
FIG. 14 is a flowchart for describing an example of operations of the discriminator illustrated in FIG. 13.

(Discrimination Scheme 2: FIGS. 13 and 14)

In the discrimination scheme 2, as illustrated in FIG. 13, the discriminator 61 is configured to include the hard decision discriminator 611, a hard decision error corrector 613, and the symbol mapper 612.

The hard decision discriminator 611 performs hard decision on a symbol (or complex electric field information) of the input main signal based on an error correction code given to the main signal on the transmission side. For example, the hard decision discriminator 611 discriminates and converts the complex electric field information into code information (or binary data) in comparison with a threshold value.

The obtained code information is input to the hard decision error corrector 613 (Processes P41 to P43 of FIG. 14). The hard decision error corrector 613 performs error correction on the input code information and inputs the error-corrected code information to the symbol mapper 612 (Process P44 of FIG. 14).

The symbol mapper 612 performs re-mapping on the error-corrected code information to a symbol (or complex electric field information) with the same scheme as that of the input main signal and outputs the symbol (Process P45 of FIG. 14). For example, in the case where the input main signal is a QPSK signal, similarly to FIGS. 9 and 10, the input main signal is re-mapped to any one of the four QPSK symbols represented by 2 bits on the IQ plane.

Figure 15:
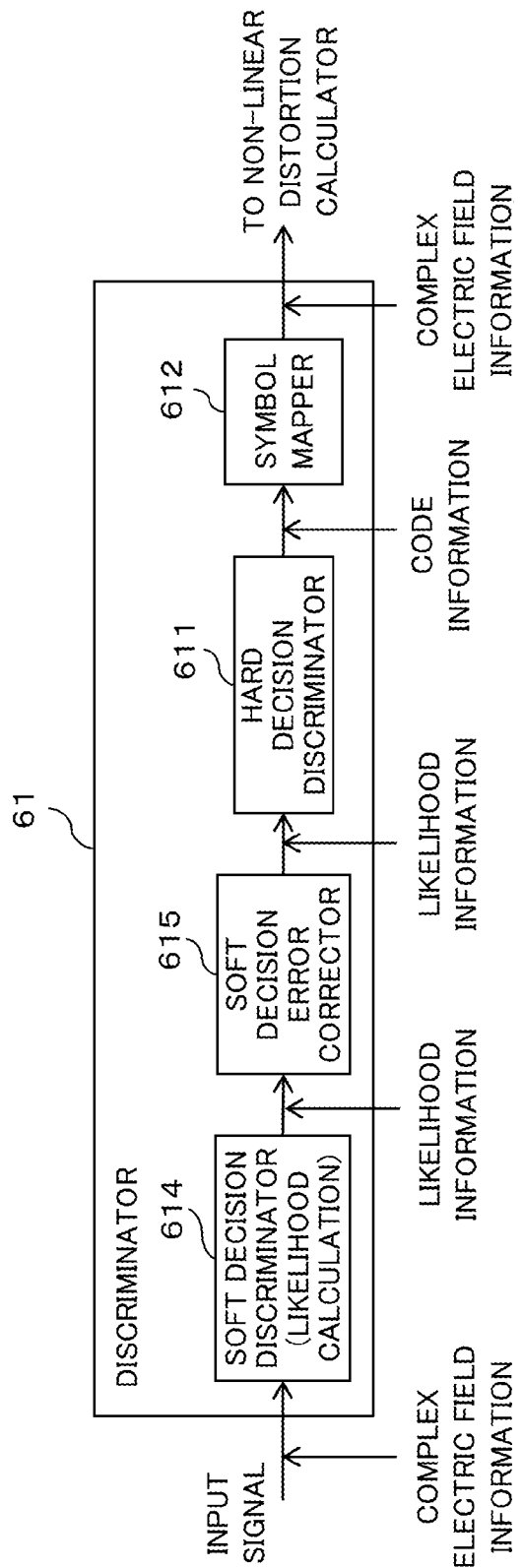
FIG. 15 is a block diagram illustrating an example of a configuration (discrimination scheme 3) of the discriminator illustrated in FIGS. 5 to 7.
Figure 16:
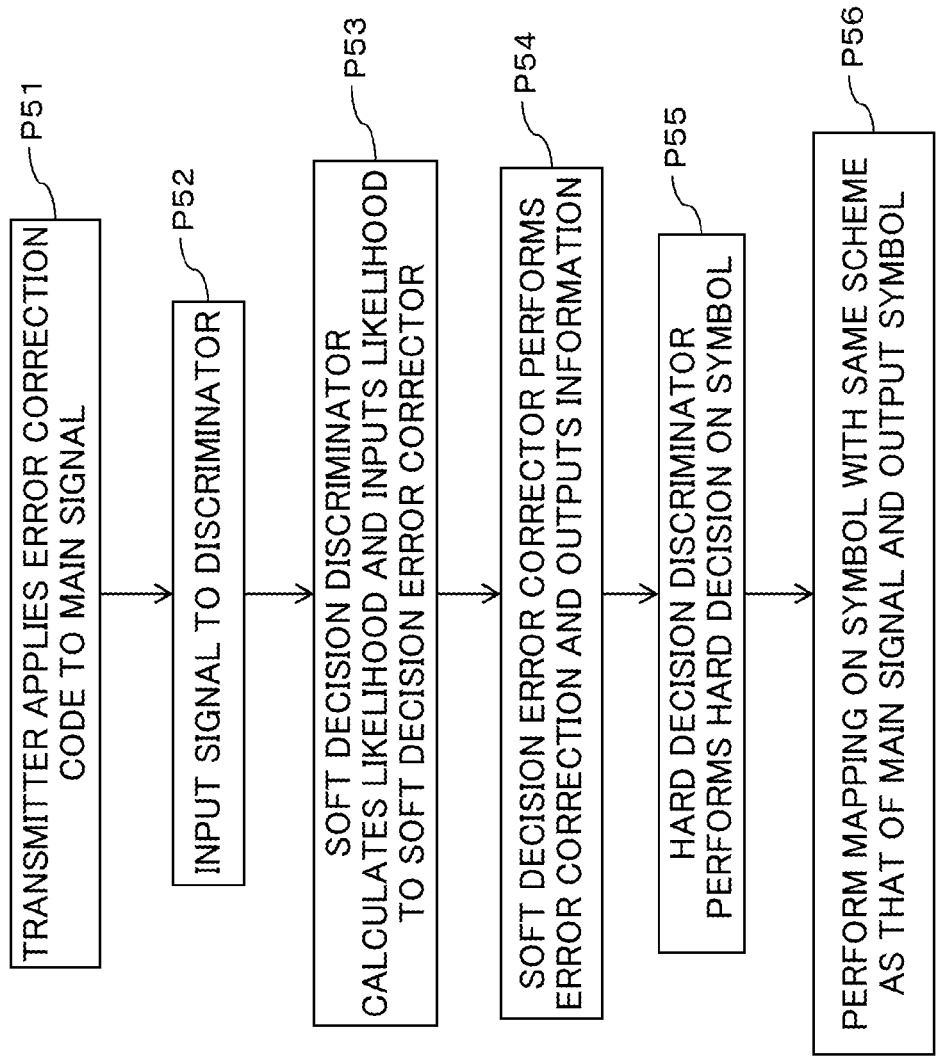
FIG. 16 is a flowchart for describing an example of operations of the discriminator illustrated in FIG. 15.

(Discrimination Scheme 3: FIGS. 15 and 16)

In the discrimination scheme 3, as illustrated in FIG. 15, the discriminator 61 is configured to include a soft decision discriminator (or likelihood calculator) 614, a soft decision error corrector 615, the hard decision discriminator 611, and the symbol mapper 612.

The soft decision discriminator 614 performs soft decision on a symbol (or complex electric field information) of the input main signal based on an error correction code given to the main signal on the transmission side. For example, the soft decision discriminator 614 calculates likelihood information of the complex electric field information and inputs the likelihood information to the soft decision error corrector 615 (Processes P51 to P53 of FIG. 16).

The soft decision error corrector 615 performs error correction on the likelihood information input from the soft decision discriminator 614 and inputs the error-corrected likelihood information to the hard decision discriminator 611 (Process P54 of FIG. 16). The hard decision discriminator 611 discriminates and converts the likelihood information into code information (or binary data) in comparison with a threshold value (Process P55 of FIG. 16).

The obtained code information is input to the symbol mapper 612. The symbol mapper 612 performs re-mapping on the code information to a symbol (or complex electric field information) with the same scheme as that of the input main signal and outputs the symbol (Process P56 of FIG. 16). For example, in the case where the input main signal is a QPSK signal, similarly to FIGS. 9 and 10, the input main signal is re-mapped to any one of the four QPSK symbols represented by 2 bits on the IQ plane.

Figure 17:
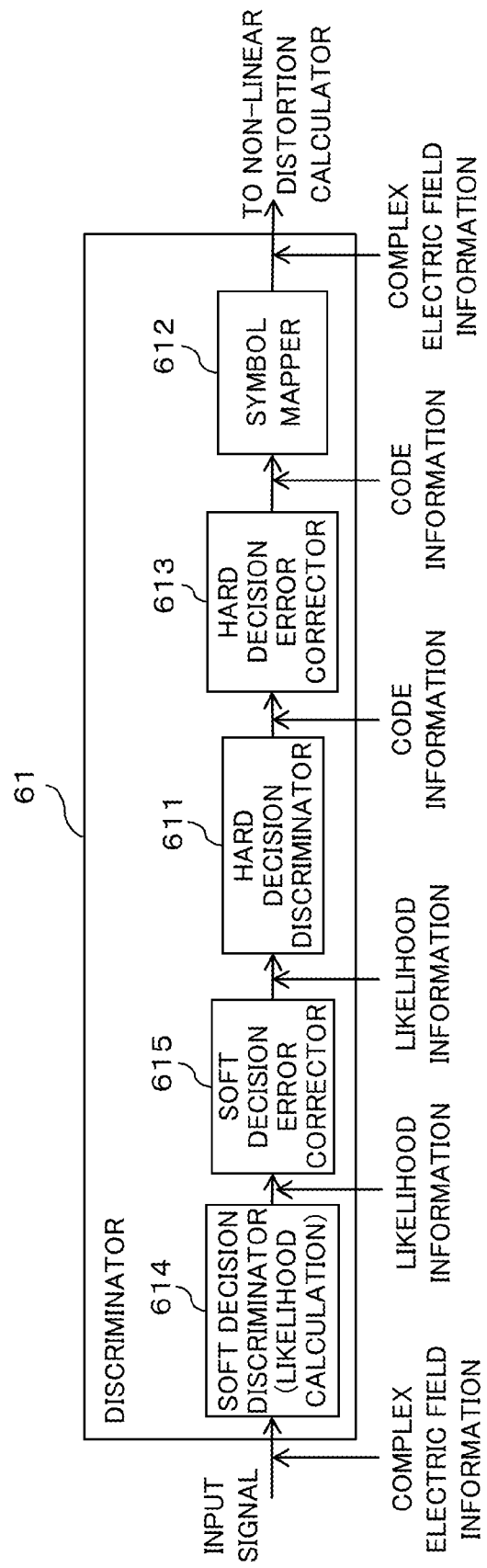
FIG. 17 is a block diagram illustrating an example of a configuration (discrimination scheme 4) of the discriminator illustrated in FIGS. 5 to 7.
Figure 18:
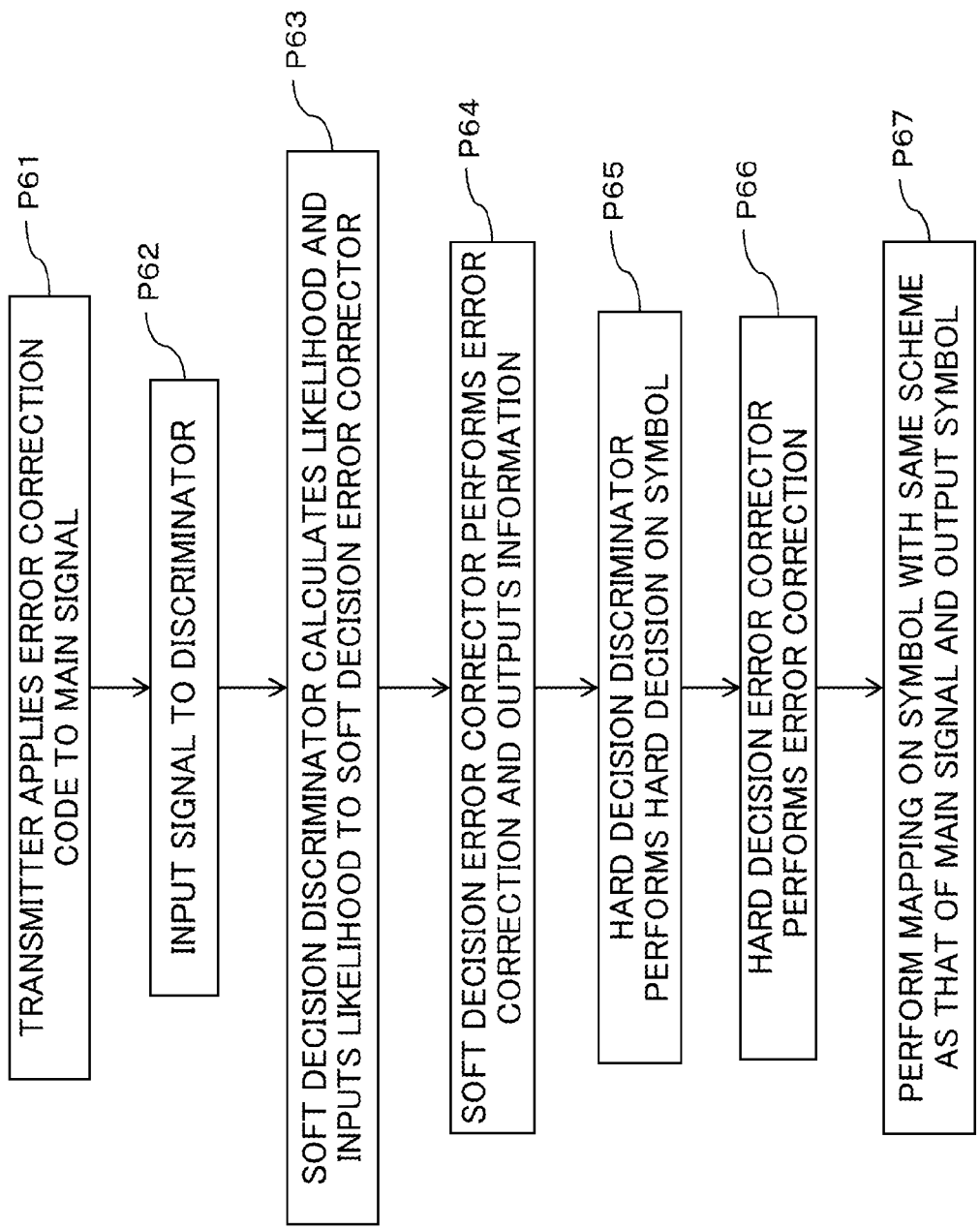
FIG. 18 is a flowchart for describing an example of operations of the discriminator illustrated in FIG. 17.

(Discrimination Scheme 4: FIGS. 17 and 18)

The discrimination scheme 4 corresponds to a combination of the above-described discrimination scheme 2 including the hard decision and the above-described discrimination scheme 3 including the soft decision. Therefore, as illustrated in FIG. 17, the discriminator 61 is configured to include the soft decision discriminator (or likelihood calculator) 614, the soft decision error corrector 615, the hard decision discriminator 611, the hard decision error corrector 613, and the symbol mapper 612.

The soft decision discriminator 614 performs soft decision on a symbol (or complex electric field information) of the input main signal based on an error correction code given to the main signal on the transmission side. For example, the soft decision discriminator 614 calculates likelihood information of the complex electric field information and inputs the likelihood information to the soft decision error corrector 615 (Processes P61 to P63 of FIG. 18).

The soft decision error corrector 615 performs error correction on the likelihood information input from the soft decision discriminator 614 and inputs the error-corrected likelihood information to the hard decision discriminator 611 (Process P64 of FIG. 18). The hard decision discriminator 611 discriminates and converts the likelihood information into code information (binary data) in comparison with a threshold value (Process P65 of FIG. 18).

The obtained code information is input to the hard decision error corrector 613. The hard decision error corrector 613 performs error correction on the input code information and inputs the error-corrected code information to the symbol mapper 612 (Process P66 of FIG. 18).

The symbol mapper 612 performs re-mapping on the error-corrected code information to a symbol (or complex electric field information) with the same scheme as that of the input main signal and outputs the symbol (Process P67 of FIG. 18). For example, in the case where the input main signal is a QPSK signal, similarly to FIGS. 9 and 10, the input main signal is re-mapped to any one of the four QPSK symbols represented by 2 bits on the IQ plane.

Figure 19:
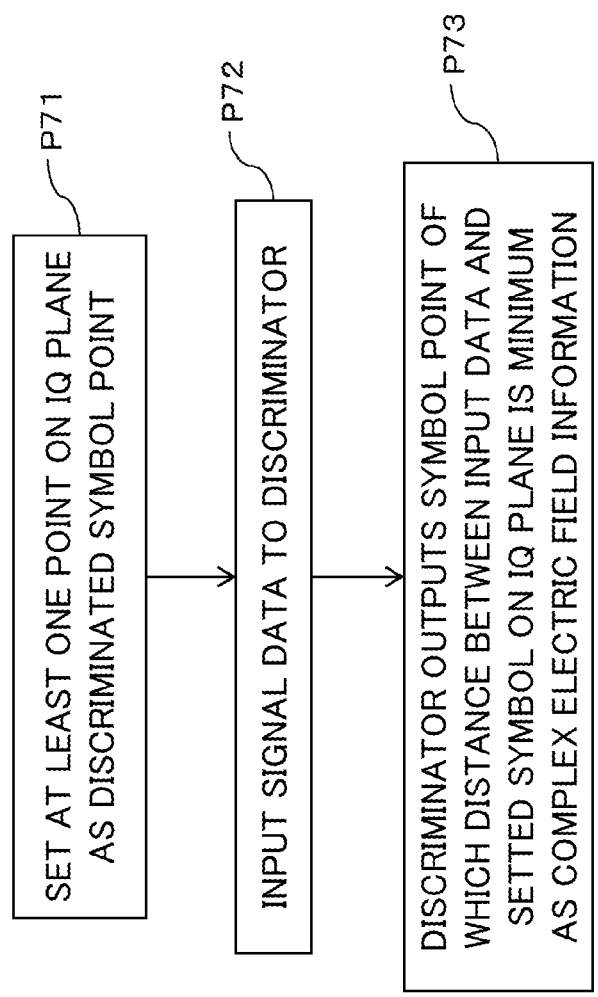
FIG. 19 is a flowchart for describing an example of operations (discrimination scheme 5) of the discriminator illustrated in FIGS. 5 to 7.
Figure 20:
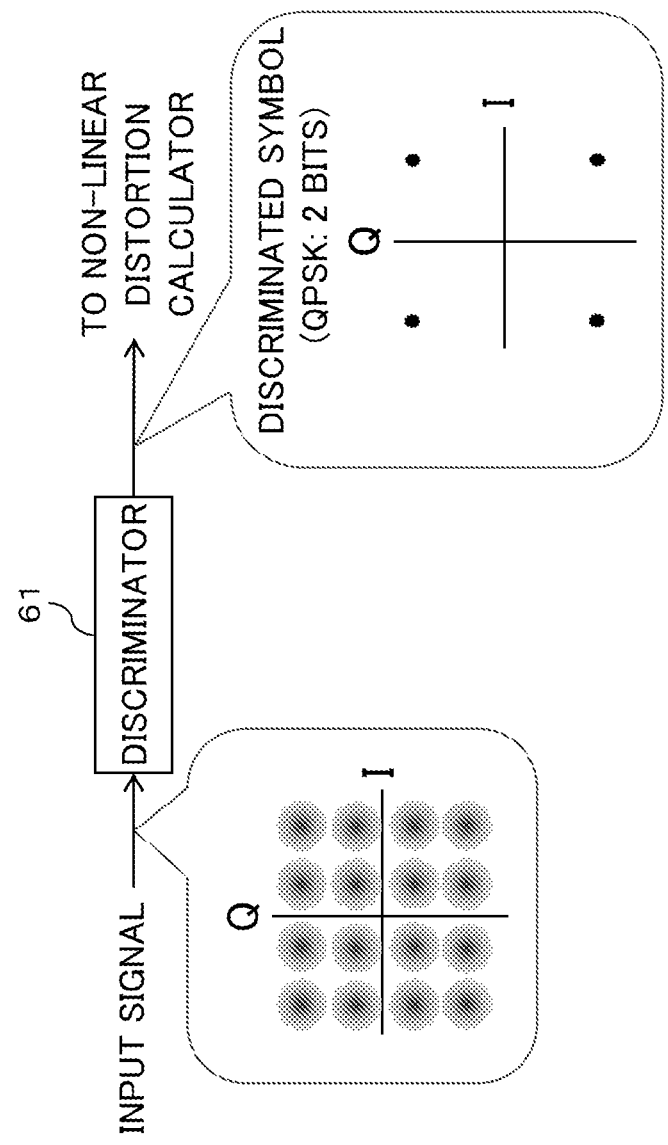
FIG. 20 is a diagram illustrating a signal input to the discriminator and a signal output from the discriminator on an IQ plane in the discrimination scheme 5.
Figure 21:
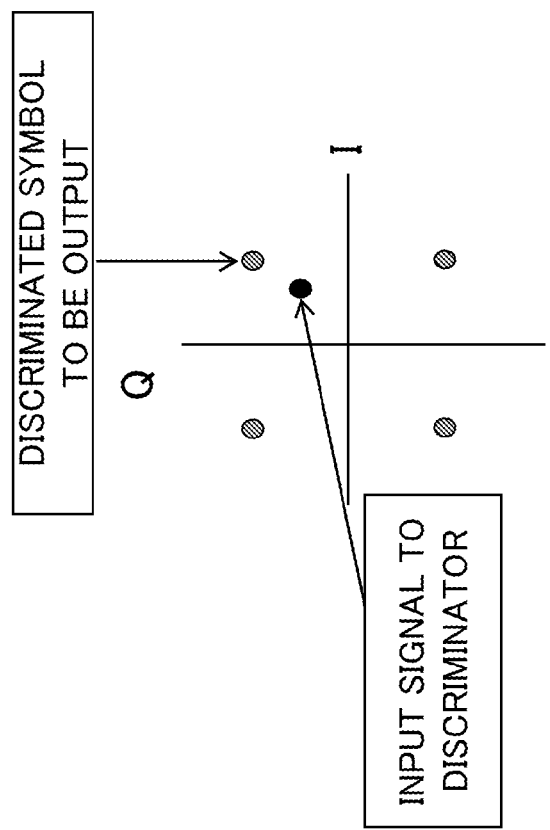
FIG. 21 is a diagram illustrating a relation between the signal input to the discriminator and the signal output from the discriminator on the IQ plane in the discrimination scheme 5.

(Discrimination Scheme 5: FIGS. 19 to 21)

In the discrimination scheme 5, an arbitrary symbol (at least one symbol) on the IQ plane may be set as a discriminated symbol in the discriminator 61 (Process P71 of FIG. 19). The discriminator 61 outputs a symbol corresponding to the set symbol of which a distance from the data of the input main signal on the IQ plane is minimum as complex electric field information (Processes P72 and P73 of FIG. 19).

Herein, for example, as illustrated in FIGS. 20 and 21, the calculation of the following stages can be simplified by setting four symbols (symbols of which a multivalued level is lower than that of the main signal) such as QPSK symbols as discriminated symbols in the 16-QAM modulated main signal.

Figure 22:
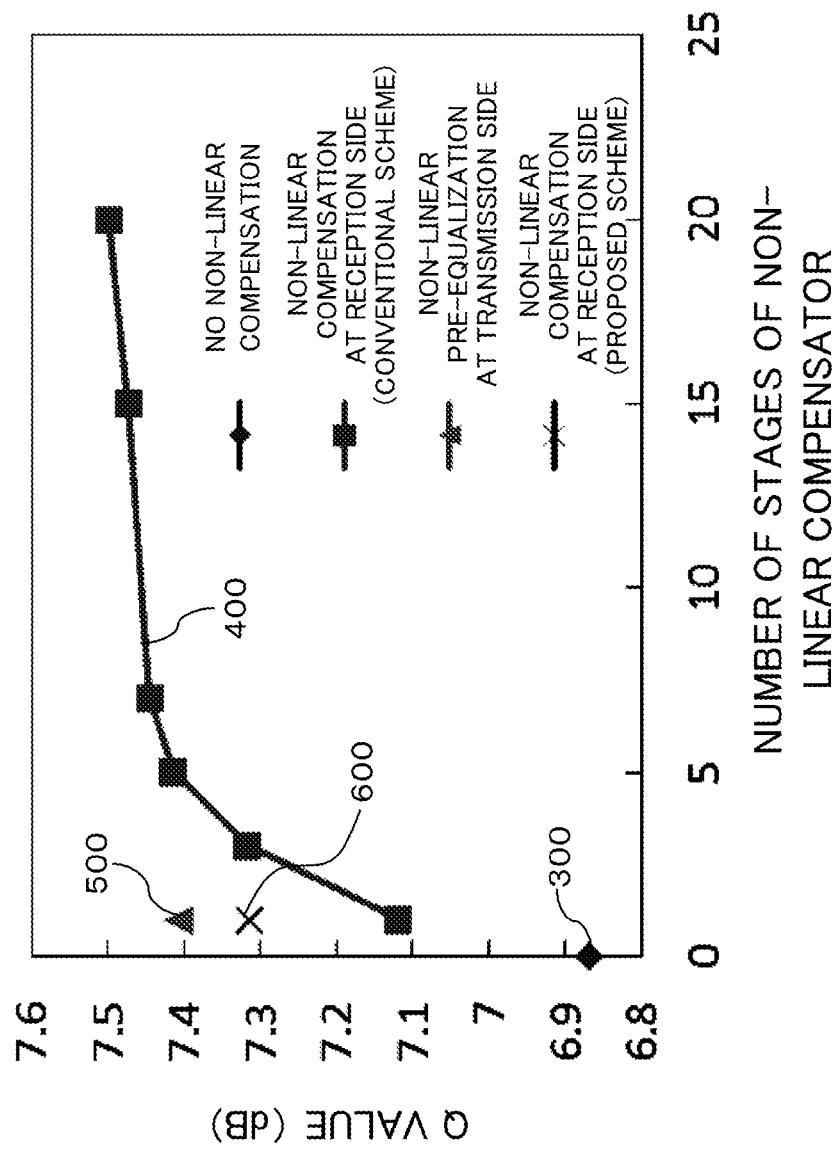
FIG. 22 is a diagram illustrating an example of a result of transmission simulation of non-linear equalization illustrated in FIGS. 4 to 21.

Next, FIG. 22 illustrates an example of a confirmatory result of the non-linear compensation effect obtained through transmission simulation by the above-described non-linear equalizer 45. In the transmission simulation, the transmission where a dual polarization (DP)-QPSK signal with 127 Gbits/second is 11-wavelength multiplexed at a 50 GHz frequency interval was simulated. Herein, the input power of the optical transmission line (or optical fiber) is set to 3 dBm/channel; the OSNR is set to 14 dB; and the length of transmission line is set to 100 km of single mode fiber×25 spans=2500 km.

In FIG. 22, the horizontal axis denotes the number of stages of a non-linear compensator, and the vertical axis denotes a Q-factor corresponding to a reception bit error rate. In addition, in FIG. 22, reference numeral 300 indicates a Q-factor of the case where no non-linear compensation is provided (the number of stages=0); reference numeral 400 indicates a Q-factor of the case where one stage to twenty stages of non-linear compensators of the related art are provided; and reference numeral 600 indicates a Q-factor of the case where one stage of the above-described non-linear equalizer 45 is provided. Herein, the "non-linear compensators of the related art" correspond to, for example, a non-linear compensator configured as multiple stages by alternately combining a dispersion compensator and a non-linear compensator in the dispersion compensator 41 disposed to the front stage of the carrier wave phase recovery 44 illustrated in FIG. 4. In addition, in FIG. 22, reference numeral 500 indicates a Q-factor of the case where the non-linear compensation is performed on the transmission side instead of the reception side (i.e., the case of non-linear pre-equalization).

As understood from FIG. 22, according to the non-linear compensation by the non-linear equalizer 45 according to the embodiment, a single stage of the non-linear equalizer 45 can achieve the same effect of improvement of the Q-factor of the case where the three stages of the non-linear compensators of the related art are provided. In addition, it can be understood that the non-linear pre-equalization (refer to reference numeral 500) of the transmission side can achieve the same effect (Q-factor) as that of the case where five stages of non-linear compensators of the related art are provided in the reception side, and if the non-linear equalizer 45 is provided in the post stage of the carrier wave phase recovery 44, the effect is slightly deteriorated. This is because the non-linear distortion is calculated based on the received signal including a code error. However, it is confirmed that the degree of deterioration is about 0.1 dB.

In the above-described example, although the discriminator 61 is provided in the non-linear equalizer 45, the discriminator 61 may be unnecessary. In this case, the non-linear distortion calculator 62 can calculate the non-linear distortion based on the signal information of the received optical signal by using perturbation analysis. However, the discriminator 61 may be provided to discriminate the signal information as a specific symbol as described before, so that the calculation of the non-linear distortion can be simplified.

Modified Example 1

Figure 23:
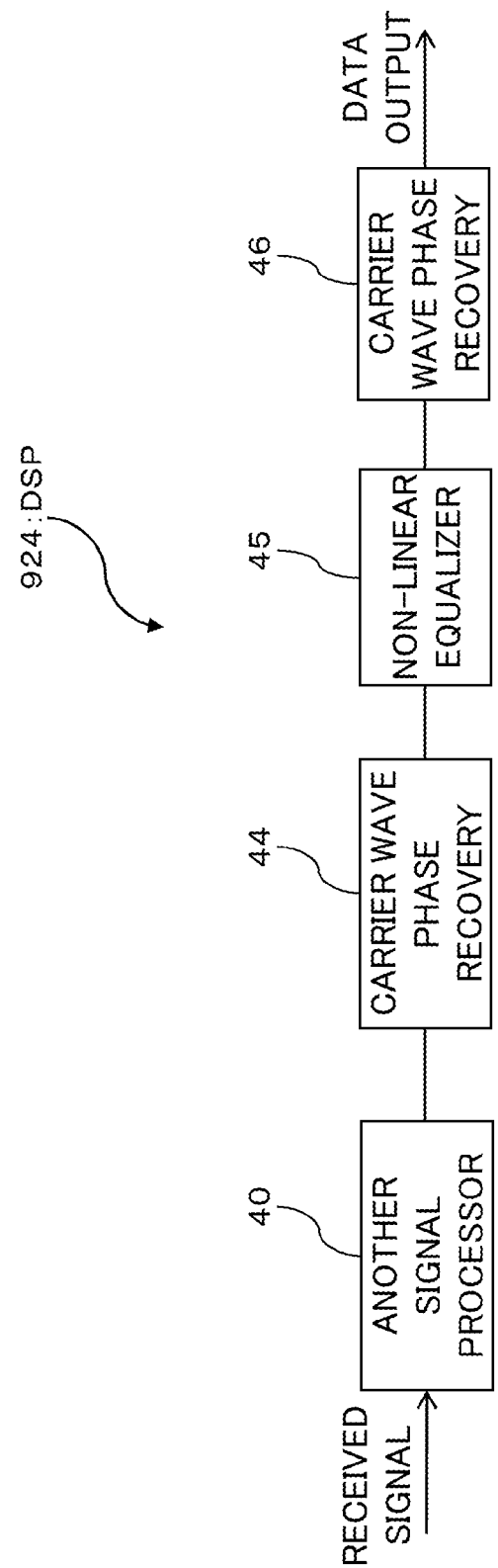
FIG. 23 is a block diagram illustrating Modified Example 1 of the configuration illustrated in FIG. 4.

FIG. 23 is a block diagram illustrating Modified Example 1 of a functional configuration of the DSP 924 illustrated in FIG. 4. In the configuration illustrated in FIG. 23, another carrier wave phase recovery 46 is provided in the post stage of the non-linear equalizer 45 which is provided in the post stage of the carrier wave phase recovery 44. The other signal processor 40 illustrated in FIG. 23 may include any one of the dispersion compensator 41, the adaptive equalizer 42, and the frequency offset compensator 43 illustrated in FIG. 4.

The carrier wave phase recovery 46 performs carrier wave phase recovery on the received signal of which non-linearity is equalized (or compensated) by the non-linear equalizer 45, so that it is possible to improve accuracy of the carrier wave phase recovery in comparison with the configuration illustrated in FIG. 4.

The algorithms of the carrier wave phase recovery used by in two carrier wave phase recoveries 44 and 46 may be the same as or different from each other. Further, the setting parameters such as the number of symbol averaging in the two carrier wave phase recoveries 44 and 46 may be the same as or different from each other. For example, the number of symbol averaging in the post carrier wave phase recovery 46 may be set to be larger than that in the front carrier wave phase recovery 44. According to this setting, coarse carrier wave phase recovery can be performed at a high rate in the front carrier wave phase recovery 44, and then, fine (or highly accurate) carrier wave phase recovery can be performed in the post carrier wave phase recovery 46.

Modified Example 2

Figure 24:
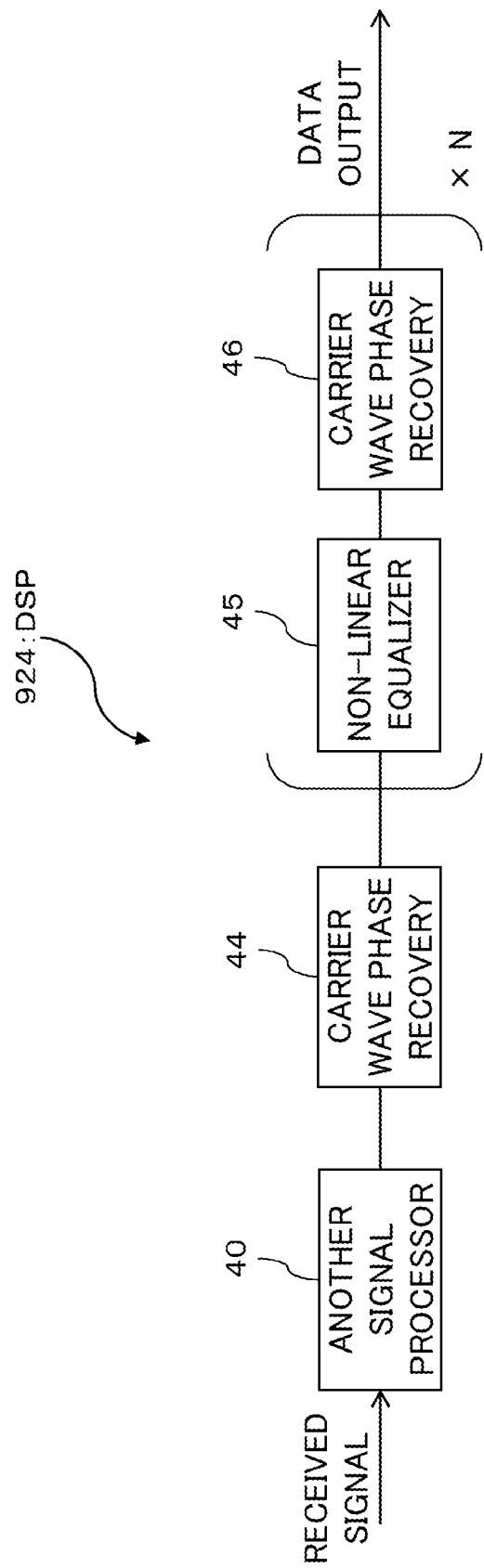
FIG. 24 is a block diagram illustrating Modified Example 2 of the configuration illustrated in FIG. 4.

As illustrated in FIG. 24, N (N is an integer of 2 or more) sets of the non-linear equalizer 45 and the post carrier wave phase recovery 46 illustrated in Modified Example 1 may be provided. In this case, the non-linear equalization and the carrier wave phase recovery are repetitively performed N times, so that it is possible to further improve the accuracy of the carrier wave phase recovery in comparison with Modified Example 1.

Modified Example 3

Figure 25:
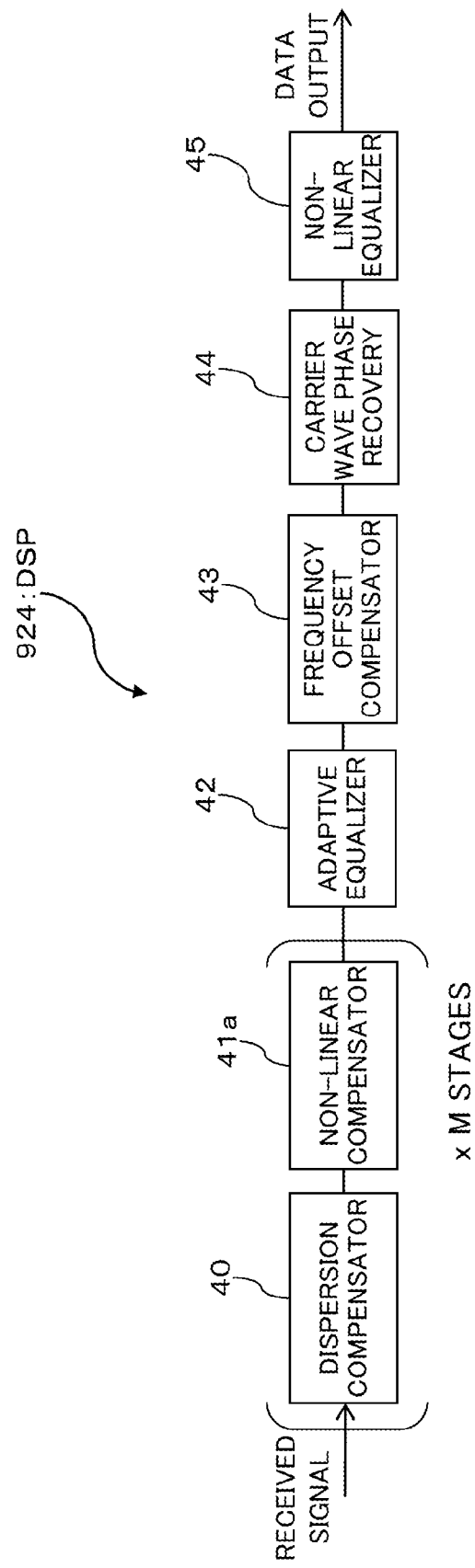
FIG. 25 is a block diagram illustrating Modified Example 3 of the configuration illustrated in FIG. 4.

The above-described non-linear equalizer 45 may be used together with another non-linear compensator (or a non-linear equalizer) may be used. FIG. 25 illustrates an example of a combination of the non-linear equalizer 45 according to the embodiment and a non-linear compensator 41a using a backward propagation method. The non-linear compensator 41a is provided, for example, in the front stage of the carrier wave phase recovery 44 (for example, in the front stage of the adaptive equalizer 42) to compensate the non-linear distortion occurred in the received signal due to the non-linear optical effect. Since the non-linear compensation is performed before and after the carrier wave phase recovery, it is possible to improve a compensation performance of the non-linear distortion.

In addition, as illustrated in FIG. 25, M (M is an integer of M≥1) stages of a set of the non-linear compensator 41a and the dispersion compensator 41 may be provided. In this case, since the dispersion compensation and the non-linear compensation are alternately performed on the received signal M times, it is possible to improve a compensation performance of the wavelength dispersion and the non-linear distortion. Other signal processors may be provided in any stages between the blocks 41, 41a, and 42 to 45 illustrated in FIG. 25.

According the above-described technique, it is possible to reduce the complexity of calculation of compensation for the non-linear distortion and to improve the capability of compensating the non-linear distortion.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:
1. A non-linear distortion compensator comprising:
a discriminator configured to discriminate signal information after recovery of a carrier wave in a carrier wave phase recovery being configured to recover a phase of the carrier wave of a received optical signal as a specific symbol according to a modulation format of the received optical signal, the modulation format being a phase modulation format or a quadrature amplitude modulation format;
a non-linear distortion calculator configured to receive the result of the discrimination from the discriminator, and to calculate non-linear distortion occurred in the received optical signal based on the signal information after recovery of the carrier wave; and
a non-linear compensator configured to compensate the non-linear distortion of the received optical signal based on the non-linear distortion obtained by the non-linear distortion calculator,
wherein the received optical signal is a signal with an error correction code, and
wherein the discriminator further comprises:
a soft decision discriminator configured to perform soft decision on the signal information;
a soft decision error corrector configured to perform error correction on a soft decision result obtained by the soft decision discriminator based on the error correction code;

a hard decision discriminator configured to perform hard decision on an error correction result obtained by the soft decision error corrector; and a hard decision error corrector configured to perform error correction on a hard decision result obtained by the hard decision discriminator based on the error correction code.

2. The non-linear distortion compensator according to claim 1, wherein the discriminator further comprises:

a symbol mapper configured to map an error correction result obtained by the hard decision corrector to the specific symbol.

3. The non-linear distortion compensator according to claim 1, wherein the discriminator configured to output a symbol as the result of the discrimination, the symbol being at least one of symbols set on a complex plane as a discriminated symbol and a distance of the discriminated symbol from the input signal information on the complex plane being in minimum.

4. The non-linear distortion compensator according to claim 3, wherein a multivalued level of the symbol set on the complex plane is lower than a multivalued level of the received optical signal.

5. A method of compensating non-linear distortion, the method comprising:

recovering a phase of a carrier wave of a received optical signal;

discriminating signal information after the recovery of a carrier wave as a specific symbol according to a modulation format of the received optical signal, the modulation format being a phase modulation format or a quadrature amplitude modulation format;

calculating non-linear distortion occurred in the received optical signal based on the signal information after the recovery of the carrier wave; and compensating the non-linear distortion of the received optical signal based on the non-linear distortion obtained by the calculation, wherein the received optical signal is a signal with an error correction code, and wherein the discriminating further comprises:

performing soft decision on the signal information;

performing error correction on a soft decision result obtained by the soft decision discriminator based on the error correction code;

performing hard decision on an error correction result obtained by the soft decision error corrector; and performing error correction on a hard decision result obtained by the hard decision discriminator based on the error correction code.

6. An optical receiver comprising:

a carrier wave phase recovery configured to recover a phase of a carrier wave of a received optical signal; and the non-linear distortion compensation apparatus according to claim 1.

* * * * *